United States Patent [19]

Ulug

[11] Patent Number: 4,918,620
[45] Date of Patent: Apr. 17, 1990

[54] EXPERT SYSTEM METHOD AND ARCHITECTURE

[75] Inventor: Mehmet E. Ulug, Schenectady, N.Y.

[73] Assignee: General Electric Company, Schenectady, N.Y.

[21] Appl. No.: 207,594

[22] Filed: Jun. 16, 1988

[51] Int. Cl.[4] .............................................. G06F 15/18
[52] U.S. Cl. ..................................... 364/513; 364/200; 364/274.4
[58] Field of Search ...................... 364/513, 200, 274.4, 364/274.6, 274.9, 274.2

[56] References Cited

U.S. PATENT DOCUMENTS

| | | | |
|---|---|---|---|
| 4,626,992 | 12/1986 | Greaves et al. | 364/513 |
| 4,649,515 | 3/1987 | Thompson et al. | 364/300 |
| 4,783,752 | 11/1988 | Kaplan et al. | 364/900 |

OTHER PUBLICATIONS

"A Database I/O Server with a Learning Expert System", by M. E. Ulug et al., Information Sciences 48, pp. 53-74, 1989.
"A Hybrid Expert System Combining AI Techniques with a Neural—Net", by M. E. Ulug, the Second Int'l conference on Industrial & Engrg, Applications of Artificial Intelligence & Expert Systems, Tullohoma, Tennessee, Space Institute, Jun. 6-9, 1989.
"A Quantitative—Based Expert System for LAN Development", by M. E. Ulug, Proceedings of Phoenix Conference on Computers and Communications, Mar., 1988, pp. 1-5.
M. E. Ulug, "A Quantitative Model—Base Expert System For Lan Development", 3/16/88, pp. 1-5, in Proceedings of Phoenix Conference on Computers and Communications (Seventh Annual International Conference).
"The Use of Quantitative Databases in Aladin, an Alloy Design System", Hulthage et al., The Robotics Institute, Carnegie—Mellon University, 1985.
"Fluid Therapy Consultation System", Hara et al., Automedica, (1986), vol. 7, pp. 1-16, 1986.

Primary Examiner—John R. Lastova
Attorney, Agent, or Firm—John S. Beulick; James C. Davis, Jr.; Paul R. Webb, II

[57] ABSTRACT

A computer software architecture and operating method for an expert system that performs rule-based reasoning as well as a quantitative analysis, based on information provided by the user during a user session, and provides an expert system recommendation embodying the results of the quantitative analysis are disclosed. In the preferred embodiment of the invention, the expert system includes the important optional feature of modifying its reasoning process upon finding the quantitative analysis results unacceptable in comparison to predetermined acceptance criteria.

34 Claims, 5 Drawing Sheets

STRUCTURE OF EXPERT SYSTEM FILE MODULE

RULE STRUCTURE

RULE LINKING

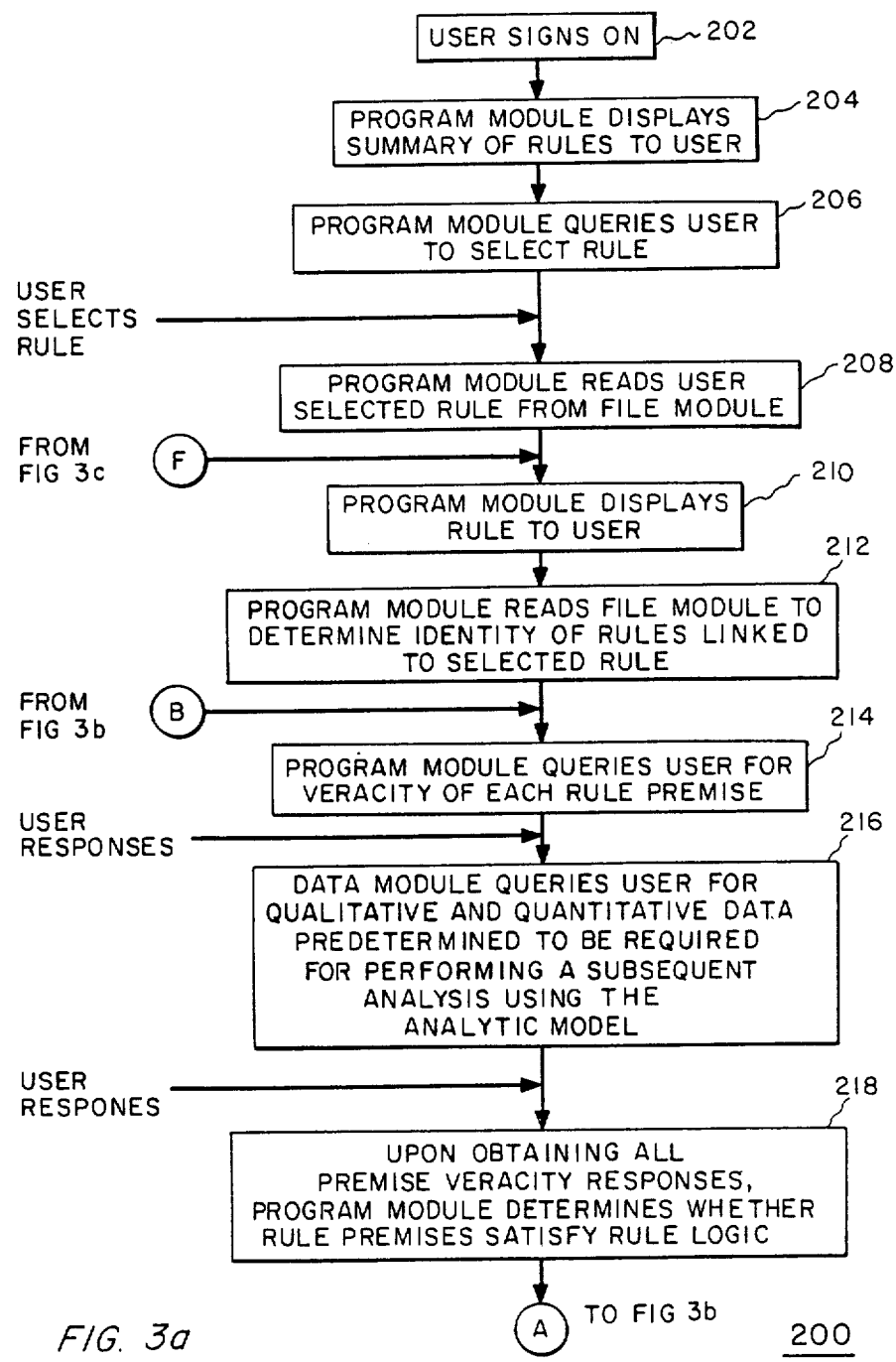

EXPERT SYSTEM METHOD AND ARCHITECTURE

A portion of the disclosure of this patent document contains material which is subject to copyright protection. The copyright owner has no objection to the fascimile reproduction by anyone of the patent document or the patent disclosure, as it appears in the Patent and Trademark Office patent file or records, but otherwise reserves all copyright rights whatsoever.

The present invention is directed in general to artificial intelligence and expert systems and, more particularly, to an expert system architecture and corresponding method of expert system operation.

BACKGROUND OF THE INVENTION

An expert system as known in the art is typically a computer software implemented rule-based reasoning system embodying the reasoning methodologies of one or more experts on a selected subject area or application. The rules comprising the expert system are formulated by a knowledge engineer who elicits information on the selected application from the experts. The expert system is implemented by a user who, in a user session, provides logical and/or data inputs and queries the system for responses on the selected application.

The knowledge engineer's task of setting up the structure of each rule in the expert system and linking the rules together as necessary is typically facilitated by the use of an expert system shell. Such shells are software packages, well known in the art, that serve to properly format rules inputted to the computer by the knowledge engineer thereby relieving him/her of formatting concerns. Of greater importance, the shell also comprises the programming for performing inference processes with the individual rules, forward and backward chaining through the rules to perform a desired reasoning process and interfacing with the expert system user during the user session to elicit relevant input data and provide reasoned conclusions. The knowledge engineer is thus relieved of programming these features. The result of this arrangement is a limitation on the flexibility with which conclusions of the reasoning process can be expressed. The conclusions are "hardwired" in the sense that given the user input data, the inference process can only yield the conclusions as originally entered into the expert system shell by the knowledge engineer. With conclusions hardwired, the ability of such expert systems to embody quantitative values within a conclusion is limited to those quantitative values that are known in advance by the knowledge engineer. More sophisticated expert systems, referred to in the art as "environments" rather than shells, enable the knowledge engineer to input into the system artificial intelligence program language statements effective to perform desired functions. Such language statements afford sufficient reasoning flexibility to avoid the hardwired conclusions characteristic of the less sophisticated shells. However, such expert system environments typically do not include a user interface to enable an interactive session with the user in which the user is directly queried for data inputs deemed required by the system. Rather, relevant data is stored in advance by the user in a data base accessible by the expert system environment and the system searches that data base in order to perform the required reasoning process. Thus, while an expert system environment is capable of computing quantitative values and embodying such values in conclusions, the computations can only be performed using data loaded in advance into the data base. It would therefore be desirable to provide an expert system architecture and operating method that includes the ability to perform computations dependent on data inputs obtained by querying the user through a user interface in real time, i.e. during the user session, and wherein the computational results can be embodied within the conclusion provided to the user.

Another limitation of known expert systems is their inability to perform additional reasoning to determine whether a conclusion reached is a desirable conclusion and to take further action to appropriately modify a reasoning process upon determining that the conclusion is undesirable. It is characteristic of human reasoning to modify the reasoning process upon observing that a conclusion is unacceptable in view of other predetermined criteria. For example, the thinking process of a business person evaluating a proposal may require the logical condition A & B & C & D to be true (where "&" is conjunctive). If upon evaluating the proposal using this reasoning, the business person finds the probability associated with meeting this logical condition is unacceptably small (i.e. too risky), he/she may, based on experience, modify the reasoning logic such that the proposal depends on ((A & B) or (C & D)), which will have a higher probability of success. As a second example, an engineer performing a design task may reach a result deemed to be undesirable in view of predetermined design criteria. The engineer would, using his/her expert knowledge, effect an appropriate change in the reasoning process that should yield a more acceptable result and repeat the relevant portion of the design process. Thus with respect to both examples, the human, upon being confronted with an unacceptable conclusion from a reasoning process, modifies the reasoning process in a manner intended to provide a more desirable result. It would therefore be desirable to provide an expert system architecture and system operating method capable of providing a reasoning process in which the system can assess the acceptability of a conclusion and upon finding the conclusion unacceptable, appropriately modify and repeat the reasoning process.

Expert systems and system shells known in the art are, for the most part, programmed in artificial intelligence languages such as LISP or PROLOG. As a result, such systems must be run on special purpose computing workstations adapted for running that language. Such workstations are typically not entirely operable as stand alone units. Instead, the workstations often require interconnection, e.g. through a local area network, with a central unit for access to additional necessary facilities such as for graphics processing and file storage. Such workstations typically have longer execution times when processing expert system environments such as described above, as compared to program execution on a personal computer where the expert system program is coded in a conventional language such as "C". Therefore, in implementing an expert system in an application where real time user interaction is required and where speed of operation is significant, e.g. where the system responses are utilized to guide operation of a corresponding physical system or process, an artificial intelligence language based expert system running on a workstation may be less suitable than a "C" language based system running on a personal computer. It is additionally noted that while personal computing apparatus is self-contained and substantially less expensive in contrast to the above described workstations, personal computers have limited capability for processing artificial intelligence languages. It would therefore be desirable to provide an expert system architecture and expert system operating method for practice on personal computing apparatus that is not subject to the above described disadvantages associated with artificial intelligence language workstations.

OBJECTS OF THE INVENTION

It is a principal of the present invention to provide an expert system architecture and operating method that is not subject to the aforementioned problems and disadvantages.

It is an additional object of the present invention to provide an expert system architecture and operating method that enables computation of quantitative values during an interactive user session, where such computed values are dependent on user provided input data.

It is a further object of the present invention to provide an expert system architecture and operating method capable of providing a reasoning process in which the system can assess the acceptability of a conclusion and upon finding the conclusion unacceptable, appropriately modify and repeat the reasoning process.

It is another object of the present invention to provide an expert system architecture and operating method for practice on personal computing apparatus.

SUMMARY OF THE INVENTION

The foregoing objects of the present invention are achieved by means of a new and improved expert system software architecture and method for operating a digital computer having a memory for storing files. The system architecture includes file storage of a plurality of alphanumeric strings representing rule premises and rule conclusions as well as a rule indicator of how the premises of each rule are to be logically combined. The architecture further includes programming for reading a user selected one of the rules stored in the memory and for subsequently displaying the selected rule to the user. Additional programming is provided for querying the user for a response regarding the veracity of each premise of the selected rule, for determining from the rule indicator a specific logic to be applied for combining the premises of the selected rule and for applying, upon receiving user input regarding the veracity of each rule premise, the specific logic to the selected rule premises to determine whether the specific logic is satisfied. The architecture additionally includes an analytic model of an application being represented by the expert system. The model comprises a plurality of subroutines that are callable for performing a quantitative analysis of the represented application. Yet further programming is provided for querying the user for information to enable performance, using the analytic model, of a quantitative analysis associated with the selected rule and for calling a selected model subroutine associated with the user selected rule. The architecture provides, for the selected rule, an expert system recommendation to the user embodying the quantitative analysis performed by the model.

As an optional feature, the expert system architecture further includes programming for comparing quantitative analysis results obtained from the selected subroutines with predetermined acceptability criteria. The architecture may include a number of alternatives to address the situation of finding unacceptable analytic results. As one alternative, the user may be queried for additional information to enable performance of an additional quantitative analysis. Then, an additional model subroutine is called to perform the additional quantitative analysis and the system recommendation embodies the results of the additional quantitative analysis. As a second alternative, upon finding unacceptable analytic results, the architecture can include programming for electing a predetermined alternate rule to substitute for the selected rule. Additional programming would be provided for querying the user for a response regarding the veracity of each alternate rule premise not contained in the selected rule as well as for additional information to enable performance of any additional quantitative analyses associated with the alternate rule. The architecture would also include programming to call model subroutines to perform each additional quantitative analysis. The system recommendation would embody the results of any additional quantitative analyses. With respect to the alternate rule, the system architecture can include programming to form that rule in either of two ways. First, the alternate rule can be formed by writing directly into the memory to modify the selected rule in a predetermined manner to form the alternate rule. A second way to form the alternate rule is to have it as an entirely different rule stored in memory, with the identity of the alternate rule being predetermined in accordance with the results comparison.

In accordance with the preferred embodiment of the present invention, the architecture is partitioned to include a system file module for storing the alphanumeric strings representing the rules and a program module for reading the user selected rule from the file module, displaying the selected rule to the user, querying the user for premise veracity responses, determining the specific logic to be applied for combining the selected rule premises and applying that logic to the rule premises, given the user premise veracity inputs, to determine whether the logic is satisfied. The preferred architecture is further partitioned into the system analytic model and a data module. The data module includes the programming for querying the user for data to enable performance of the quantitative analyses associated with the rule, calling the selected model subroutine and providing the expert system recommendation.

The method of the present invention for operating a digital computer to practice an expert system, where the digital computer has memory for storing data files, commences with an initial step of storing in the memory a plurality of alphanumeric strings representing rule premises and rule conclusions as well as a rule indicator of how the premises of each rule are to be logically combined. Next, an analytic model of an application being represented by the expert system is stored in the memory. As described above, the model comprises a plurality of subroutines that are callable for performing a quantitative analysis of the represented application and provides corresponding quantitative analysis results. The method continues with the steps of: reading a user selected one of the stored rules; displaying the selected rule to the user; querying the user for a response regarding the veracity of each premise of the selected rule; determining, from the rule indicator associated with the selected rule, a specific logic to be applied for combining the premises of the selected rule; and applying, upon receiving user input regarding the veracity of each rule premise, the specific logic to the premises of the selected rule to determine whether the specific logic is satisfied. Next, the user is queried for information to enable performance, using the analytic model, of a quantitative analysis associated with the selected rule. Then, a selected one of the model subroutines associated with the selected rule is called. The method concludes with the step of providing to the user, for the selected rule, an expert system recommendation embodying results of the quantitative analysis.

Corresponding to the options described above for the expert system architecture, the method can include the optional step of comparing with predetermined acceptability criteria the quantitative analysis results obtained from the selected subroutine. The method also embodies the various alternatives provided to address the situation where the analytic results are found unacceptable.

BRIEF DESCRIPTION OF THE DRAWINGS

While the specification concludes with claims defining the features of the invention that are regarded as novel, it is believed that the invention, together with further objects thereof will be better understood from a consideration of the following description in conjunction with the drawing figures, in which:

FIGS. 3a, 3b and 3c show a flowchart illustrative of the expert system operating method of the preferred embodiment of the present invention.

DESCRIPTION OF THE INVENTION

The present invention is directed to a computer software architecture and operating method for an expert system that performs rule-based reasoning as well as a quantitative analysis, based on user provided information, and provides an expert system conclusion/recommendation embodying the results of the quantitative analysis. In a preferred embodiment of the present invention, the expert system includes the important optional feature of modifying its reasoning process upon finding the quantitative analysis results unacceptable in comparison to predetermined acceptance criteria.

Figure 1:
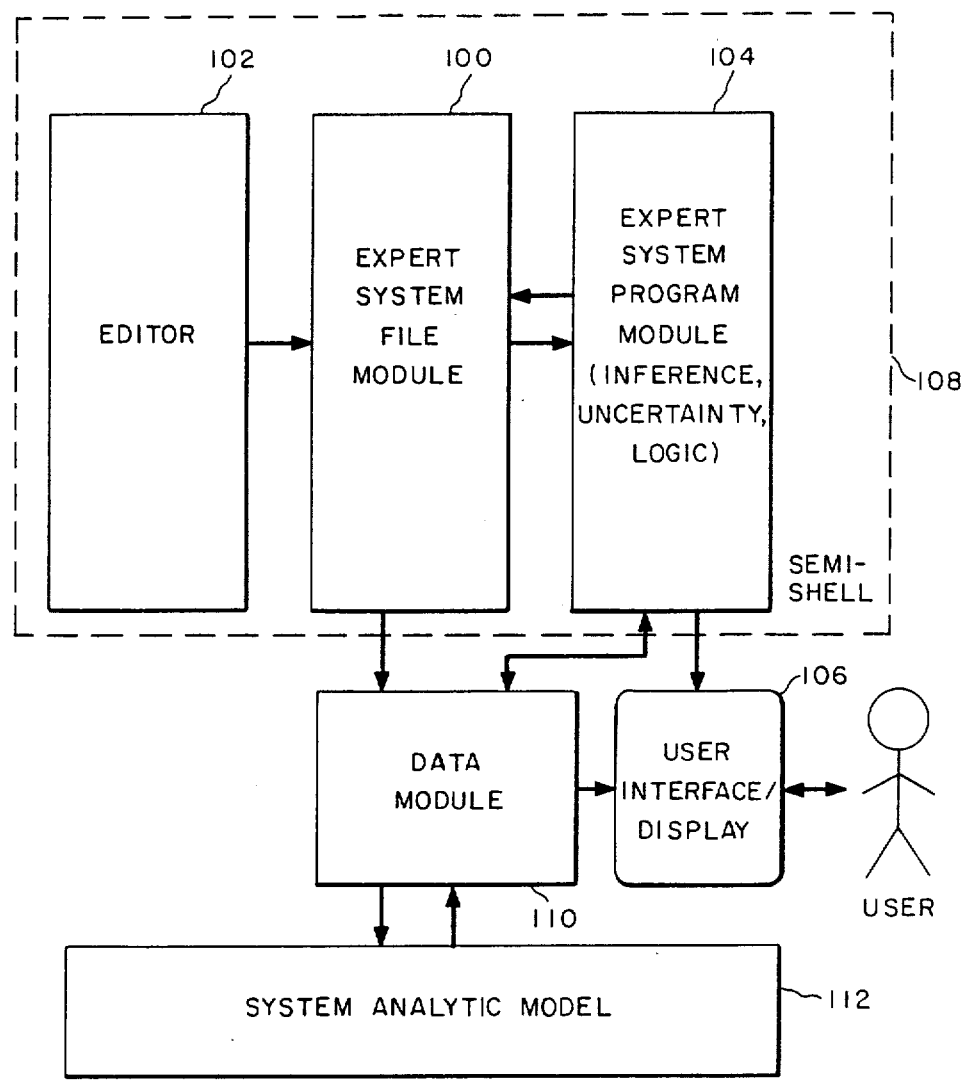
FIG. 1 is a block diagram illustrating the expert system architecture of a preferred embodiment of the present invention.
Figure 2:
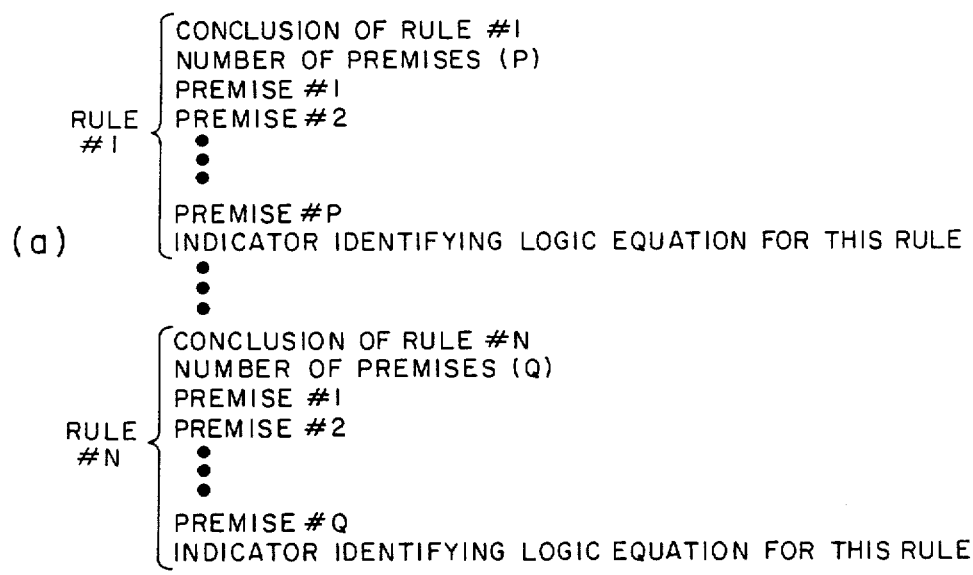
FIGS. 2a and 2b illustrate the form in which rules and rule linking information are stored in a file module of the expert system architecture of the present invention.
Figure 2:
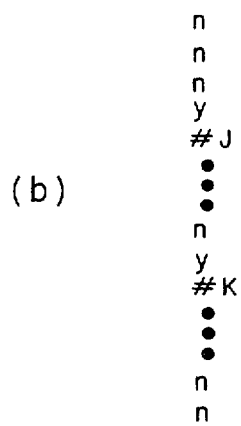

Referring now to the drawings, FIG. 1 illustrates, in block diagram form, the expert system software architecture of a preferred embodiment of the present invention. The architecture is intended for implementation on any general purpose or personal computer though it can readily be adapted for practice on an artificial intelligence language workstation. The system architecture includes an expert system file module 100 for storing, in computer memory as a series of alphanumeric strings, the rules comprising the expert system. FIGS. 2a and 2b illustrate the file module structure, with FIG. 2a showing how the rules are stored. As seen in FIG. 2a, for each rule, file module 100 stores the rule conclusion text, a number equal to the number of rule premises, the text of the rule premises and a numerical indicator that identifies the particular logic equation to be used for logically combining the rule premises to infer the corresponding rule conclusion. FIG. 2a illustrates the file module storing the rules for an expert system having a total of N rules, where rule #1 has P premises and rule #N has Q premises. It is noted that the file module only serves to store the information indicated in FIG. 2a as a series of alphanumeric strings in the sequence shown. The strings are accessed by another module for rule implementation, as will be described more fully below.

FIG. 2b illustrates another portion of the file module allocated for the optional storage of rule linking information. This information consists of a list of n's and y's, respectively meaning "no" and "yes", which occur in a sequence generally corresponding to the rules of the expert system. The n's and y's serve as answers to questions such as: Does the corresponding rule have as one of its premises the conclusion of another rule? For each n response, no further information is required for the corresponding rule. Each y response, however, is followed by the number of the rule (e.g. #J or #K in FIG. 2b) the conclusion of which is a premise to the rule corresponding to the y. For each rule which has another rule conclusion as a premise thereto, the answers to additional questions are stored in the file module as described in greater detail below.

Referring again to FIG. 1, the expert system architecture of the present invention further includes an editor 102 which serves one of the functions performed by the above described expert system shells known in the art. The editor serves to elicit from the knowledge engineer and store in the expert system file module the expert system rules and rule linking information. Thus, the primary function of the editor is to assure that the rules and rule linking information are stored in the format illustrated in FIGS. 2a and 2b. In view of the limited function of editor 102, the knowledge engineer may, for a relatively simple set of rules, choose to dispense with the editor and instead directly write the rules and rule linking information into file module 100.

The description of the expert system architecture and operating method of the present invention is facilitated herein by illustration of a particular expert system for local area network (LAN) technology. The LAN expert system is constructed to have an architecture and operate in accordance with the present invention. It is coded in the "C" language for practice on either a mainframe or personal computer. Selected portions of the files and source listing of the LAN system will be provided in Appendices to this specification to better illustrate various features of the present invention. The LAN expert system has a total of 43 rules of which rules 1–10, as stored in the expert system file module, are shown in Appendix A. Appendix B to this specification contains rule linking information, as generally described above with respect to FIG. 2B, for the 43 rules of the LAN system.

Referring again to FIG. 1, the expert system architecture of the present invention additionally includes an expert system program module 104. The program module comprises the programming responsible for driving the expert system to proceed through a session with a system user. The program module queries the user to select a rule for evaluation by the system, reads that selected rule from the file module and displays it for the user. A user interface/display 106, illustrated in FIG. 1, is suitable to enable such interaction with the user. The program module subsequently queries the user regarding the veracity of each rule premise and upon completing this inquiry for all of the rule premises, performs an inference process to determine, in view of the logic prescribed for combining the rule premises, whether the corresponding conclusion may be inferred from the rule premises (i.e. whether the rule fired). As an optional feature of the architecture of the present invention, multiple rules may be linked together such that the conclusion of one rule serves as a premise to another rule. Such rule linking may be effected through either AND or OR linking logic. Where such rule linking is included in the system architecture, the program module after the user selects the rule to be evaluated, reads the file module to determine whether another rule is linked to the selected rule. Upon determining the existence of a linking rule, the program module also queries the user regarding the veracity of each premise of the linking rule. The program module subsequently determines whether the selected rule has fired in view of the user provided rule premise veracities, for the selected and linking rules, and rule linking logic.

As another optional feature, an expert system constructed in accordance with the present invention may include the ability to reason with uncertain information. In such a case, the program module would query the user for uncertainty information with respect to the selected rule and its rule premises. Given the uncertainty information, the inference process is preferably performed by the program module in a manner to provide a certainty factor associated with the expert system conclusion. While various techniques are known in the art for reasoning with uncertainty and are adaptable for practice on the expert system architecture of the present invention, one technique is illustrated hereinbelow with respect to the exemplary LAN expert system.

The expert system file module together with editor 102 and program module 104 constitute a semi-shell 108 generally analogous to the expert system shells described hereinabove and known in the art. However, the function of semi-shell 108 is limited in comparison to the known shells as described herein. While the semi-shell enables input of rules and rule linking information via editor 102 and is capable of performing inference processes via program module 104, it does not hard-wired conclusions as described above for known expert system shells. The substance of each expert system conclusion is formulated during the interactive user session primarily by a data module 110. For each rule premise, upon completion by the program module of querying the user regarding premise veracity, the data module queries the user for additional quantitative and qualitative data to support subsequent performance of quantitative analyses. The analytic results are embodied in the system conclusion provided to the user. The analyses are performed within a system analytic model 112 comprising a plurality of subroutines germane to the particular application addressed by the expert system. The data module determines which subroutine(s) to call on the basis of the selected rule identity and the user responses to the premise veracity inquiries made by the program module. In view of the application specific nature of the functions performed by the data module and system model, it is necessary for these elements of the expert architecture to be programmed by the knowledge engineer. It is for this reason that data module 110 and system model 112 are illustrated as outside semi-shell 108 in FIG. 1 and that the shell is considered a "semi-shell" rather than a full shell. The nature of such application specific programming will become apparent in light of the description hereinbelow of the exemplary LAN expert system.

Figure 3B:
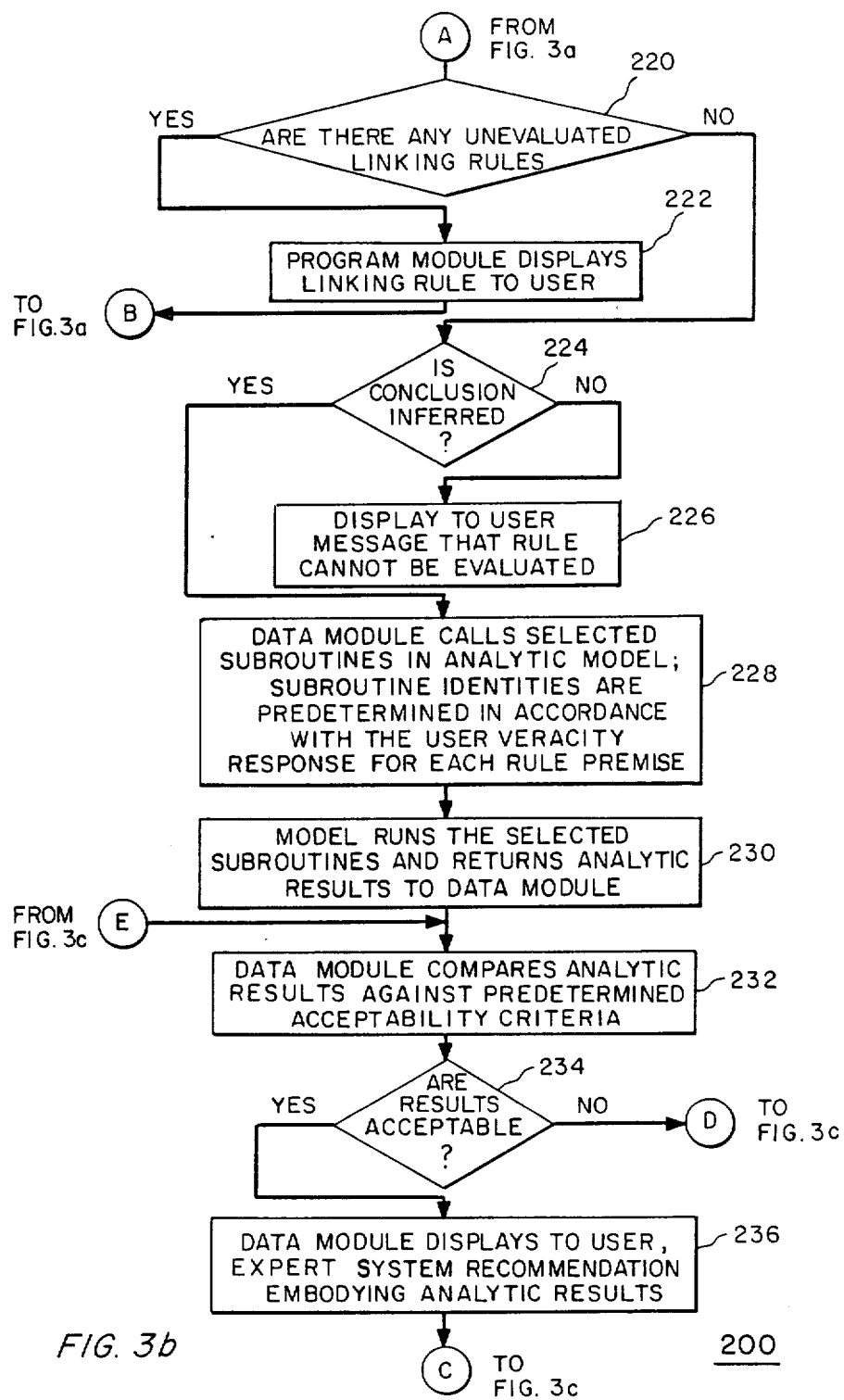
Figure 3C:
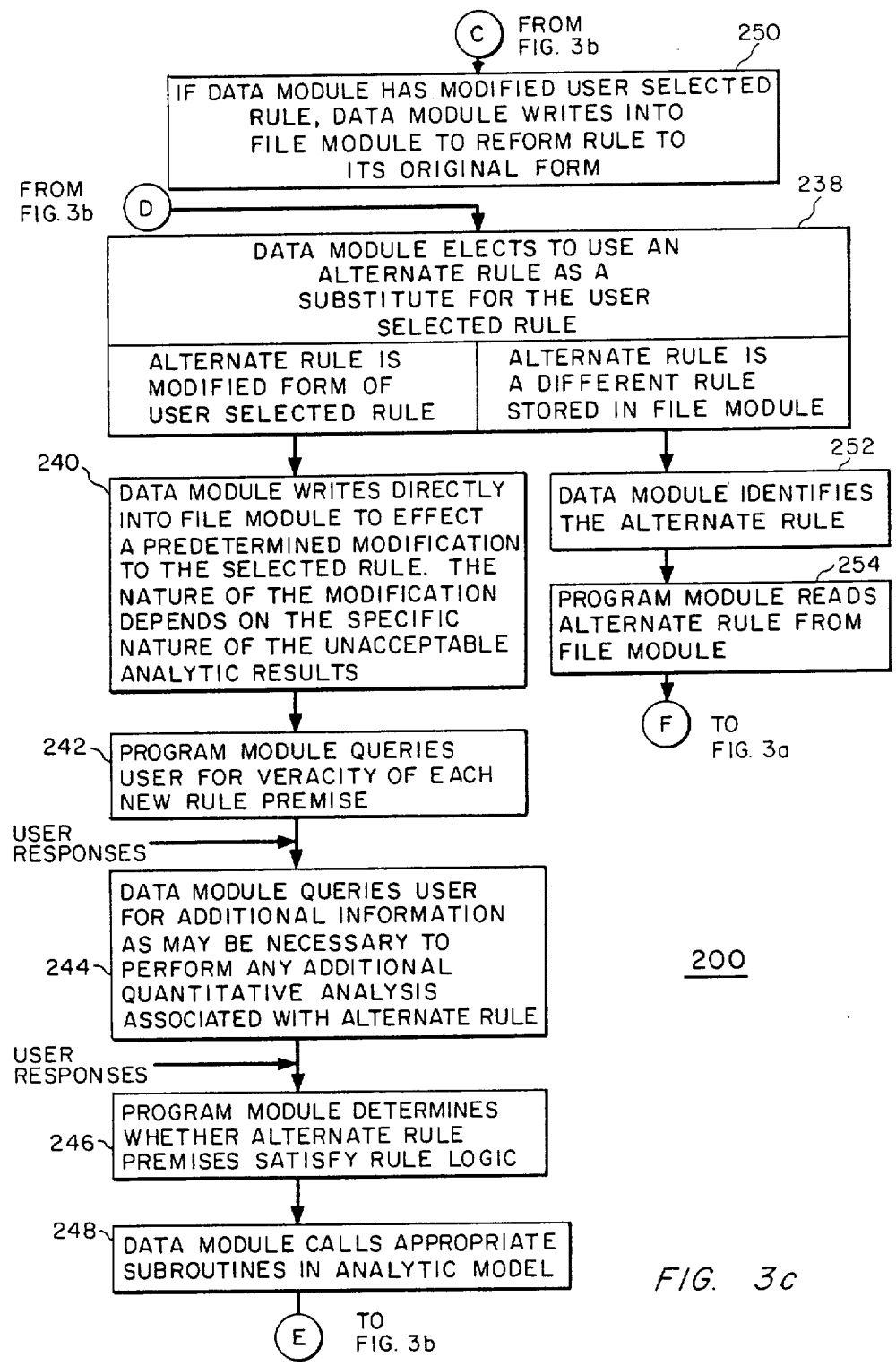

FIGS. 3a, 3b, 3c illustrate a flowchart 200 which embodies the expert system operating method of the present invention as well as the nature of the interaction between the user and the inventive expert system architecture. The user is the actual person (or persons), e.g. in a factory or office environment, who provides logical and/or data inputs to the system in order to elicit therefrom a system recommendation on aspects of the particular application addressed by the expert system. Initially, the user signs onto the system at step 202. Next, as an optional but preferred feature of the present invention, the user is offered, by the program module, a display of the text of any system rule (step 204). At step 206, the user is requested to select a rule for evaluation by the expert system. Next, at step 208, the program module reads the user selected rule from file module 100 and displays the text of that rule (step 210) to the user. This display includes all of the information pertaining to the rule stored in the file module, i.e. the rule text, the number of premises, the numerical indicator identifying the logic equation to be used to combine rule premises and the corresponding logic equation. In the case where the expert system includes the capability to link rules together such that the conclusion of one rule may be provided, through AND or OR logic, as the premise of another rule, the program module reads the appropriate portion of the file module to determine the identity and linking logic of any rules linked to the user selected rule, i.e. any rule the conclusion of which is a premise to the selected rule. Next at step 214, the program module queries the user regarding the veracity of each rule premise. If the expert system includes the optional feature of reasoning with uncertain information, the user is queried at this point as to whether uncertain reasoning is to be used. If it is, then the premise veracity query is instead conducted in a manner to elicit from the user the appropriate uncertainty information about each rule premise. As indicated above, there are various known techniques for reasoning with uncertainty and the particular technique elected for the expert system will determine the appropriate questions to ask the user.

The data module, at step 216, queries the user for both qualitative and quantitative data permitting to the user selected rule and, preferably, displays the user responses to confirm their accuracy. As an optional feature, the knowledge engineer may program the data module to provide default values for requested data for use where the user is unable to provide the information. Upon all premise veracity information and data module elicited qualitative/quantitative data being collected, the program module determines (step 218) whether the rule premises satisfy the rule logic. It is important to note that, it is not possible to yet determine whether the rule conclusion can be inferred since there may be other rules linked to the user selected rule. Thus, referring to FIG. 3b, at step 220 it is determined whether there are any rules, as yet unevaluated, linked to the user selected rule. If there is an unevaluated linking rule, the program module displays it to the user at step 222. The flowchart then returns to step 214 of FIG. 3a to repeat steps 214, 216, 218 and 220 in order to evaluate the linking rule. This process of evaluating linking rules will continue until all rules linked to the selected rule are evaluated such that the answer to the condition at step 224 is "no". Given the evaluation of each linking rule, the data module is then able to determine whether the selected rule's conclusion can be inferred (step 224) from the rule premises (including linking rules). If the rule conclusion cannot be inferred, the data module so advises the user at step 226. It is noted that, in view of the subsequent quantitative analysis to be performed, the conclusion is merely a place holder for those analytic results and an associated system recommendation.

If it is determined at step 224 that the rule conclusion can be inferred, the flowchart will then pass to step 228 in which the data module calls selected subroutines of system model 112 to perform analyses pertinent to the user selected rule. In the absence of the rule linking feature, the flowchart would proceed directly from step 218 to step 224. The identities of the subroutines called by the data module preferably depend on the responses to the rule premise veracity queries previously posed by the program module. Thus, at step 230 the model runs the called subroutines and returns the results to the data module.

As an important optional feature of the expert system architecture of the present invention, the data module may include additional programming to enable comparison of selected quantitative analysis results, as provided by model 112, with predetermined acceptability criteria. Flowchart 200 reflects this feature at step 232 in which the data module compares the analytic results obtained from the system model subroutines against predetermined acceptance criteria. Such acceptance criteria will have been known to the knowledge engineer at the timer the data module software is written. If at step 234 it is determined the results are acceptable, the data module displays to the user at step 236 the expert system conclusion/recommendation which embodies the analytic results. If, at step 234, the analytic results are found to be unacceptable, a number of alternative actions may be pursued depending on the nature of the user selected rule being evaluated. The appropriate alternative will have been determined in advance by the knowledge engineer and programmed into the data module. In the case where the knowledge engineer determines that only a simple alternate computation needs to be performed to provide the user with a meaningful conclusion (this case not being illustrated in flowchart 200), the user can be immediately queried for any required additional information and the alternate computation performed. The result of that alternate computation would be embodied in a system conclusion/recommendation displayed to the user. Where a simple computation does not suffice, the knowledge engineer may determine that an alternate rule should be used as a substitute for the user selected rule. Referring to FIG. 3c where flowchart 200 continues, that determination would be made by the data module programming, at step 238. The alternate rule may simply be a modified form of the user selected rule, such as where it is only necessary to alter the logic applied to the premises of the selected rule to produce the alternate rule, as in the case of the business evaluation example described above. In such a case, the flowchart proceeds to step 240 in which the data module writes directly into the file module to effect a predetermined modification to the user selected rule. Since the nature of the modification is determined in advance by the knowledge engineer, that modification can be made a function of the specific nature of the unacceptable analytic results. If the rule modification entails any new or changed rule premises, the program module would, at step 242, query the user for the veracity of each such new or changed premise. Further, additional qualitative and/or quantitative information may be required from the user to perform additional quantitative analysis in support of the alternate rule, such additional information being queried from the user by the data module at step 244. Given the rule veracity information, the program module applies the logic of the alternate rule to determine whether the rule conclusion can be inferred from the rule premises (step 246). At step 248, the data module calls any system model subroutines for providing analytic results required in support of the alternate rule. At this point, the program returns to step 232 (FIG. 3b) where the results are compared and the process repeats. Thus, where the results continue to be unacceptable, it may become necessary to further modify the alternate rule. Once an acceptable result is achieved and the user is provided with a system recommendation (step 236), the data module, at step 250, writes into the file module to reform the user selected rule to its original, premodified form.

Still referring to FIG. 3c, at step 238, the data module may instead elect to use an entirely different rule, stored in the file module, to substitute for the user selected rule as the alternate rule. Again, such an election is predetermined by the knowledge engineer and embodied in the data module programming. In such a case, the number of the substituted rule is identified by the data module at step 252 and, at step 254, the program module reads the alternate rule from the file module. The flowchart then returns to step 210 to obtain all necessary information from the user to enable rule evaluation and the flowchart proceeds through all subsequent steps as described hereinabove. Operation in accordance with the flowchart therefore terminates at either step 222 (FIG. 3b) when it is determined that the rule cannot be evaluated or at step 236 when the user is provided with the expert system recommendation. If the selected rule was modified at step 240, the passage through the flowchart would terminate at step 250 where the rule is reformed.

The structure and operation of those aspects of the LAN expert system illustrative of salient aspects of the present invention are described next. As indicated above, the LAN expert system is written in the "C" programming language for practice on either a general purpose or personal computer. The description of the LAN system will be in the context of the expert system architecture illustrated in FIG. 1 and flowchart 200 of FIGS. 3a, 3b and 3c. The program module portion of the LAN system consists of a plurality of subroutines/functions. It is noted that program subroutines are called "functions" in the 'C' language. A program named "main" is referred to herein as a program rather than a function due to its control over the LAN system operation. The "main" program serves to initialize various registers and flags which are accessed by other programs comprising the expert system. The source listing of the "main" program is contained in Appendix C. The last line of "main" is a call to a function named "driver_function". The "driver_function" function, hereinafter referred to as "driver", is part of the program module and serves to drive the entire LAN expert system through the user session. The "driver" source listing is contained in Appendix D and, as can be seen, serves to call a sequence of other functions. This first function called by "driver" is a "LAN_EXPERT" function, the source listing of which is shown in Appendix E. The "LAN_EXPERT" function, which is part of the program module, opens the file module (referred to in the listing as the "ES_file") so that a user selected rule (not yet selected) can be read therefrom. "LAN_EXPERT" calls a function called "uncertain" which initially calls a function called "view". The source listing of "uncertain" and "view" are contained in Appendices F and G, respectively. The "view" function prints introductory comments for the user and queries whether the user wishes to see the summary of any rules. The "view" function calls the "summary0" function if the user indicates a desire to see a rule summary. The "summary0" function, the source listing of which is shown at Appendix H, in turn calls another function having a name of the form "summary#" where "#" is the number of the rule the user wishes to see a summary of. A listing of the functions "summary1" through "summary6" is contained in Appendix I. "Summary0" continues to call rule summaries for the user's viewing so long as the user so requests. The "uncertain", "view", "summary0" and "summary#" functions are all part of the program module. The display of rule summaries corresponds to step 204 of flowchart 200. When the user no longer wishes to view rule summaries, "uncertain" is returned to where the user is queried for the rule number to be used, i.e. the user selected rule for evaluation (step 206 of flowchart 200). Once a rule is selected, "uncertain" further queries the user as to whether reasoning will be conducted with uncertain information, referred to as "fuzzy logic" in "uncertain".

Control then returns to the "LAN_EXPERT" function (Appendix E) where the user selected rule and associated information is read from the file module and displayed to the user (steps 208 and 210 of flowchart 200). The "LAN_EXPERT" also reads the number of the logic equation to be used to combine rule premises (referred to as "NL[r]" in the listing) and on the basis of the logic equation number, calls one of a plurality of functions named "segment1" through "segment16", each such function corresponding to a different one of the sixteen possible logic equations for combining, with AND or OR logic, up to four rule premises. The source listing for the "segment1" through "segment16" functions is shown in Appendix J. As can be seen, each "segment" function serves to load one or more nine bit numeric strings into registers having designations such as L, M, N or O. This is done in preparation for the subsequently performed inference process as is described below.

Upon completion of the appropriate "segment" function, operation of the "LAN.EXPERT" function is complete and control returns to "driver" which calls a "links2" function. The source listing of "links2", which is part of the program module, is contained in Appendix K and its operation corresponds to step 212 of flowchart 200. The "links2" function scans the portion of the file module containing the rule linking information, as shown in FIG. 2b and Appendix B. The "links2" function opens the appropriate portion of the file module, designated "ES2_file" in the listing, to enable reading of the information therein. An initial "fscanf" statement serves to determine whether a "y" is listed, in the file module, for the user selected rule to indicate that another rule is linked thereto. If a "y" is not read, no further reading of the file is required. If a "y" is read, a second fscanf statement serves to read the number of the linking rule. Then, a third fscanf statement serves to read a "y" or "n" as an answer to the question "Is the "L_flag" set?", where the L_flag serves to indicate a conjunctive connection between rules. A fourth fscanf statement serves to read "y" or "n" also as a response to whether the linking rule is connected to the selected rule through "AND" logic. Thus, if an "n" is read, the link is through "OR" logic. Next, a fifth fscanf statement reads a "y" or "n" indicating whether there is yet another rule linked to the selected rule. If there is, further reading of the program module is required as seen in the listing of "links2".

Upon completion of execution of "links2", control is returned to "driver" which next calls a function named "data" which is part of the program module. The code listing of "data" is contained in Appendix L. The "data" function serves to query the user regarding rule premise veracity information. In the case where the user has elected to use uncertain reasoning, "fuzzy logic" in the LAN system, "data" elicits a rule attenuation factor from the user via a function "atten", a source listing of which appears in Appendix M. In support of the user elected fuzzy logic, the "data" function next elicits a characterization of the first rule premise via a function "ling", the source listing of which is contained in Appendix N. The "atten" and "ling" functions are part of the program module. As can be seen, the "atten" and "ling" functions elicit uncertainty information from the user by way of linguistic assessments. The papers "Using T-norm Based Uncertainty Calculi in a Naval Situation Assessment Application" by P. Bonissone, 3rd Workshop on Uncertainty in Artificial Intelligence, Seattle, WA, July 1987 and "A Real-Time AI System for Military Communications" by M. E. Ulug, Proceedings of Third IEEE Conference on Artificial Intelligence Applications, Orlando, FL, 1987 describe such use of linguistic assessments in detail. In the case where uncertain reasoning is not being used, the "data" function simply queries the user as to whether the first rule premise is true. Querying the user about the rule premises corresponds to step 214 of flowchart 200. As practiced in the LAN expert system, the user response regarding premise veracity is stored in numerical form in a register (K-register) for use in the subsequent inference process. It is noted that, for simplicity, in practicing fuzzy logic a linguistic response of "most likely" or better is treated as "yes" and all other responses are treated as "no" with respect to premise veracity. While it appears that an affirmative response regarding each premise veracity is required to confirm the premise, a premise could be structured such that negative user response serves to confirm the premise. The present invention can, of course, be successfully practiced with both types of rule premises. Though such a feature is not illustrated herein, programming to accommodate such negative confirming responses is within the skill of the art.

After the user response regarding premise veracity is stored in the appropriate register, "data" calls a "part1" function, the source listing of which is shown in Appendix O. Depending on the number of the user selected rule (=r), the "part1" function calls, in sequence, one or more of functions "part1a" through "part1n". Each of the latter functions serves to query the user for qualitative and quantitative data relevant to the user selected rule. As an illustration, a listing of "part1a" through "part1g" is contained in Appendix P. The "part1" and "part1a" through "part 1n" functions are contained in the data module, such data queries corresponding to step 216 of flowchart 200. After completion of the "part" functions, "data" checks if the logic equation for a single rule premise is being used. If it is, then a function "section1" is called by "data" to perform the inference process for the one premise rule form using the user response regarding the rule premise veracity. If the user selected rule has more than one premise, "data"

proceeds to query the user about the veracity of the second premise (using fuzzy logic if necessary) and calls a "part2" function. That function in turn calls one or more "part2a" through "part2z1" functions which query the user for additional qualitative and quantitative data about the selected rule. If the selected rule has only two premises, an appropriate "section" function is called to perform the inference process on those premises. If there are more than two rule premises, the user querying process continues until the user is queried regarding the veracity of all premises of the selected rule. The appropriate "section" function is then called to perform the inference process. There are sixteen functions "section1" through "section16", respectively for performing inference for each of the sixteen different possible logical combinations of up to four rule premises. These sixteen functions are listed in their entirety in Appendix Q. The operation of the appropriate "section" function serves to determine whether the rule premises, given the user responses, satisfy the rule logic and corresponds to step 218 of flowchart 200. There is not at this point a determination that the rule conclusion can be inferred since other program logic must first review whether there are rules linked to the user selected rule.

The process by which inference is performed in the LAN expert system is described next. The inference process as well as selected aspects of the LAN expert system are described in the paper entitled "A Quantitative Model-Based Expert System for LAN Development" by M. E. Ulug, Seventh Annual International Phoenix Conference on Computers and Communication, Phoenix, AZ, March 1988, which is incorporated in its entirety herein by reference. As indicated above, when the rule logic is identified, one or more registers designated "L" through "O" may have a numeric string loaded therein. Each numeric string loaded into a register corresponds to premise veracities that would satisfy the rule logic, where "1"and "0" respectively correspond to "yes"and "no". For example, for a four premise rule having the logic A or B or C or D, numeric patterns such as 0001, 0010, 0100 and 1000 all represent satisfaction of the rule logic. The convention used herein is that the premises occur from right to left in the numeric pattern, i.e. the number at the right end of the pattern corresponds to the "A" premise. As a second example, the logic ((A & B) or (C & D)) is considered. The numeric pattern 0011 and 1100 represent premise responses that satisfy the rule logic. It is noted that two registers (L and M) would be utilized to load the patterns of the second example while four register (L, M, N, AND O) would be used for the first example. The user responses regarding premise veracity are loaded into the K-register in numeric form with a "1" for each true premise and "0" for each false premise. Again using the right to left convention, if the user indicates, for a four premise rule, that the first two premises are true and the last two are false, these responses are loaded into the K-register as 0011. Ultimately, to perform inference, the appropriate "section" function compares bit for bit the K-register contents with each register previously loaded by one of the "segment" functions. The comparison seeks a 1-0 encounter between each L, M, N or O register and the K-register, where such an encounter means the rule is not satisfied.

In the process of performing inference, where "fuzzy logic" is not being used, each "section" calls a function called "identity" to check the 1-0 encounters between registers. In the case where the user has elected to use "fuzzy logic", each "section" may call functions named "table2", "table3" or "table4". These "table" functions may in turn call "msgo" and "trans" functions, the "table", "msgo" and "trans" functions serving to compute certainty values. The source listings of "identity", "table2", "table3", "table4", "msgo" and "trans" are contained in Appendix R of this specification.

After inference is performed by the appropriate "section" function, control returns to the "data" function the execution of which is complete at that point. Control therefore returns to "driver" which next calls a "finals" function, the source listing of which appears in Appendix S. The "finals" function, which is part of the data module, first determines whether there is an unevaluated rule linked to the user selected rule (corresponding to step 220 of the flowchart) and, if there is, returns control to the data module which proceeds to call a "finals2" function. That function, described more fully below, upon determining that there is an unevaluated linking rule returns control to the "driver" function. The "driver" next calls a function named "out", the source listing of which appears in Appendix T, which is the last function in the sequence of functions to be called by "driver". The "out" function serves to set the value of a variable "OK" to either "0" or "1" depending on the values of various flags, the value of "OK" being a determinate of whether the expert system should continue to run. As can be seen in Appendix C which contains the listing of the "main" program, the value of "OK" determines whether "driver" is called. Thus, if "OK" is set to "0", then "driver" is not called and program operation ends. An example of when continued running of the expert system program is inappropriate is when the rule conclusion is not inferred. In that case, a "z_flag", tested by "out", is set to "0", as seen in the listing of "finals2", described below. Thus, so long as "OK" remains equal to "1", "driver" is again called by the "main" program and "driver" again passed through the sequence of functions it calls, which at this point is effective to cause evaluation of the linked rule. Following evaluation of the linked rule, the "finals" function is again reached and it then determines whether there is yet another unevaluated linking rule. If there is, the above described sequence is repeated to enable evaluation of the additional linking rule.

Ultimately, upon arrival at "finals" when all linking rules have been evaluated, "finals" checks whether the user selected rule number is between 1 and 16 or is 41, since, for programming convenience, the "finals2" function processes the balance of the 43 rules. Assuming the user selected rule number is to be processed by "finals", "finals" calls a function named "inference", the source listing of which appears in Appendix U. The "inference" function evaluates the results obtained from each "section" function and applies the appropriate rule linking logic to determine if the conclusion of the user selected rule can be inferred, i.e. it determines whether the user selected rule has fired. The "inference" function also performs the same determination even where there are no linking rules. The function returns a value "1" or "0" depending upon whether, respectively, the rule has or has not fired. In addition to determining whether to return "1" or "0", "inference", only in the case where the user has elected to use "fuzzy logic", calls a function named "fuzzy". That function determines the linguistic characterization of the rule conclusions's certainty and displays that characterization to the user. The "fuzzy" function can call the above noted "table2", "table3" and "table4" functions (Appendix R) as well as a "write" function which displays the appropriate conclusion certainty for the user. The source listings for "fuzzy" and "write" are contained in Appendix V.

As indicated above, the "inference" function returns a "1" or "0" value to the "finals" function which, if a "0" is returned, displays to the user that the user selected rule is not fired, i.e. that it cannot be evaluated (steps 224, 226 of flowchart 200). If a "1" is returned by "inference" to "finals", the latter function calls one of sixteen different "msg#" functions, where "#" is the user selected rule number (the same "msg" function is called for both rules 11 and 41). Each "msg#" function is part of the data module and serves to call for the performance of one or more analyses by the system model (step 228 of flowchart 200). For illustration, the source listings of "msg1" through "msg6" are contained in Appendix W. A source listing of some functions contained in the system model is shown in Appendix X. The running of the called subroutine/function by the system model corresponds to step 230 of the flowchart. As can be seen, each "msg#" function calls at least one function in the system model. Further, each "msg#" function causes the text of the LAN expert system recommendation/conclusion to be displayed to the user. The analytic results are embodied in the system recommendation. As indicated above, it is preferred herein that the identity of each called system model function be determined by the nature of the user premise veracity responses. This feature is illustrated in the "msg#" function source code in Appendix W where, generally, the values of various "sensor" parameters, the values of which are a function of the user veracity responses, determine which functions are called.

After the appropriate "msg#" function has executed, control returns to "finals", the execution of which is also complete. Therefore control returns to "driver" which calls the "finals2" function the source listing of which appears in Appendix Y. As noted above and as can be seen in the "finals2" source listing, "finals2" serves the same purpose as "finals", where the user selected rule number is greater than sixteen (except for rule 41), with respect to calling "inference" and, upon determining that the user selected rule has fired, calling the appropriate "msg#" function. Functions named "msg17" through "msg43" perform the same function as described for the other "msg#" functions.

As described above with respect to flowchart 200, an expert system having the architecture and operating method of the present invention may, as an optional feature, include comparison of the analytic results with predetermined acceptability criteria. In the absence of such a feature, the flowchart would simply proceed from step 230 to step 236 where the system conclusion/recommendation is displayed to the user. This is the case for all rules of the LAN expert system except for rule 11. For that rule, the data module compares the analytic results against an acceptance criterion (step 232) and if the comparison is unacceptable (step 234), calls on the system model to perform an additional analysis. The results of that additional analysis are embodied in a system conclusion/recommendation displayed to the user. These processes are contained in the function "msg11", the source listing of which is shown in Appendix Z.

While the LAN expert system does not include an example of alternate rule formation as embodied in step 238 (FIG. 3c) of flowchart 200 and the steps thereafter, Appendix AA contains a source listing of "C" code effective to cause rule modification. That is, the code represents one method by which the data module writes into the file module to effect a predetermined rule modification. The "original" and "modified" forms of the rules are also listed in Appendix AA. The original rule to be modified is located in an "ES_file" as a sequence of alphanumeric strings corresponding to the rule premises, conclusions and other relevant information, as in the case of rule storage in the LAN expert system. Selected lines of the original rule which remain unchanged during the modification are copied into a "RULE[2]" buffer. Those unchanged lines of the rule are copied from the buffer into a "DT_file" where the modified rule will be formed. Additionally, modified information is written into the DT_file in lieu of or in addition to selected lines of the original rule. When the modified rule is completely formed in the DT_file, it is stored in "RULE[NC]" buffers. The contents of these buffers are then written into the ES_file over the original rule. While not shown, if it is desired to subsequently reform the rule to its original form, a copy of the original rule could initially be copied into yet another file. Then, the original rule copy could be written over the modified rule in the ES_file to reform the original rule. The code listed in Appendix AA corresponds to step 240 (FIG. 3c) of flowchart 200.

The LAN expert system demonstrates that expert systems constructed in accordance with the architecture of the present invention and operated in accordance with the corresponding inventive method can be coded in a general purpose language such as "C". That is, for successful practice, the expert system need not be coded in an artificial intelligence language such as LISP or PROLOG. As a result, the expert system coded in "C" can be practiced on a general purpose or personal computer.

While each subroutine of the system model consists of one or more equations, i.e. specific relationships between the input and output variables, the invention is not so limited. In certain applications to be represented by an expert system, the required relationship between variables may be too complex to be represehted by an equation. In such cases, it may be necessary to extrapolate the desired result from available data. One way to accomplish this extrapolation function is by including a neural-net in the system model section of the expert system architecture of the present invention. A neural-net is a software simulation of a parallel distributed processing system in which each node is similar to a neuron and connected to all other nodes. In typical applications as known in the art, neural-nets are used either for pattern association, where a set of patterns are associated with another set of patterns, or for auto-association, where a partial input pattern is associated with its complete pattern. In applying neural-nets to the present invention architecture, the neural-net is utilized to associate a set of input data with a set of output data. The data module provides the user with an input and an output file. Using these files, the user enters into the system a set of input and output data. The data module then calls the neural-net software and passes to it the information contained in these files. Using this data, the neural-net software learns the relationship between the input and output data. This relationship is stored in the neural-net as weights, or strength of connections, between input and output nodes representative of the input and output variables. Subsequently, the data module asks the user for a set of new input parameters, this operation corresponding to that performed at step 216 of flowchart 200. The data module then passes the new input data to the neural-net. Using the weights between input and output nodes, the neural-net software determines the output data associated with the input data submitted by the user. Thus, the operating flexibility of the expert system can be enhanced by use of neural-net technology. A brief description of performance of pattern association by neural-nets is provided in the reference entitled "Parallel Distributed Processing" by Rumelhart et al., Vol. 1, page 446, the MIT Press, Cambridge, MA.

While in accordance with the architecture of the preferred embodiment of the present invention the various software functions performed within the system architecture are each designated as part of one of the architecture modules, the invention is not so limited. As will be recognized by those skilled in the art, the designations of program and data modules as well as the other architectural components, while preferred herein, are primarily for convenience in organizing the various program functions. To some extent, the various functions could be allocated differently among the architectural modules or, alternatively, different modules could be designated and program functions assigned thereto, all without affecting expert system operation.

While a preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

Appendix A

```
Implement the recommendation of the Expert System.
3
It is required to reduce packet service time by x%!
Length of fixed size packets is too large!
Channel capacity is far too small!
7
Implement the recommendation of the Expert System.
4
It is required to reduce the token rotation time by x%!
Packet arrival rate is too high!
Number of stations connected to LAN are too many!
Packet service time is too long!
8
Implement the recommendation of the Expert System.
3
It is required to reduce the active stations by x%!
Channel utilization, rho, is far too large!
Number of stations connected to LAN is far too large!
7
Token rotation time is changed to a new value.
2
Packet arrival rate is changed by y%!
Channel utilization is changed by z%!
3
Implement the recommendation of the Expert System.
3
It is required to reduce the token rotation time by x%!
Channel utilization is far too large!
Packet arrival rate is too low!
7
Implement the recommendation of the Expert System.
3
It is required to reduce the waiting time by x%!
Token rotation time is far too large!
Packet arrival rate is much too high!
7
Packet service time is changed to a new value.
2
```

Length of fixed size packets is changed by y%!
Channel capacity is changed by z%!
3
Mean number of active stations is changed to a new value.
2
Channel utilization is changed by y%!
Number of stations connected to LAN is changed by z%!
3
Channel utilization is changed to a new value.
2
Packet arrival rate is changed by y%!
Token rotation time is changed by z%!
3
Token rotation time will change to a new value.
4
Number of stations connected to LAN is changed by y%!
Token passing time is changed by y%!
Channel utilization is changed by z%!
Packet service time is changed by w%!
9

Appendix B n
n
n
n
n
n
n
n
n
n
n
n
n
n
n
n
n
n
n
n
n
n
n
n
n
n
n
n
n
n
n
y
26
y
y
y
28
y y
y
28
y
y
n
n
n
n
n
n
n
n
n
n
n
n
n
n

Appendix C

```
main()
{ is=0;
   V=0;
   G=0;
   Hp=0;
   Hq=0;
   Z_flag=0;
   r=0;
   N=0;
   Pp_flag=0;
   Pq_flag=0;

for (i = 0; i <= 44; i++)
        T_flag[i]=0;

for (i = 0; i <= 44; i++)
     for (j = 0; j <= 44; j++)
     {
        d_flag[i][j]=0;
        e_flag[i][j]=0;
        b_flag[i][j]=0;
     } for (i = 0; i <= 44; i++)
     for (j = 0; j <= 44; j++)
     {
        L_flag[i][j]=0;
        l1_flag[i][j]=0;
        O_flag[i][j]=0;
        o1_flag[i][j]=0;
     } for (i = 0; i <= 44; i++)
        R_flag[i]=0;

response = calloc (3,sizeof(char));
```

```c
for (i = 0; i <=44; i++)
   for (j = 0; j <= 4; j++)
   Premise[i][j] = calloc (55,sizeof(char));

for (i = 0; i < 3; i++)

deduce[i] = calloc (55,sizeof(char));

str = calloc (55,sizeof(char));

for (i = 0; i < 44; i++)
   RULE[i] = calloc (55,sizeof(char));

for (i = 0; i < 42; i++)
{
   L_register[i] = calloc (10,sizeof(char));
   M_register[i] = calloc (10,sizeof(char));
   N_register[i] = calloc (10,sizeof(char));
   O_register[i] = calloc (10,sizeof(char));
   K_register[i] = calloc (10,sizeof(char));
} for (i = 0; i <= 3; i++)
   Q_register[i]='0';

for (i = 0; i <= 42; i++)
   for (j = 0; j <= 4; j++)
   {
      V_flag[i][j]=0;
      sensor[i][j]=0;
      a_flag[i][j]=0;
      x1[i][j]=0;
      Y1[i][j]=0;
      P1[i][j]=0;
      Z1[i][j]=0;
      S_flag[i][j]=0;
   } for (i = 0; i <= 44; i++)
{
   W1[i]=0;
   E[i]=0;
   y1_flag[i]=0;
   y2_flag[i]=0;
   y3_flag[i]=0;
   y4_flag[i]=0;
   y5_flag[i]=0;
   y6_flag[i]=0;
   y6A_flag[i]=0;
   y7_flag[i]=0;
   y8_flag[i]=0;
   y9_flag[i]=0;
   y10_flag[i]=0;
   E[i]=0;
} for (i = 0; i <= 44; i++)
   for (j = 0; j <= 3; j++)
   LI_flag[i][j]=0;

C_flag=0;
FU_flag=0;
CH_flag=0;
Z1_flag=0;
Z2_flag=0;
```

```
Z3_flag=0;
Z4_flag=0;
E1_flag=0;
E2_flag=0;
E3_flag=0;
E4_flag=0;
E5_flag=0;
E6_flag=0;
E7_flag=0;
E8_flag=0;
E9_flag=0;
E10_flag=0;
E11_flag=0;
E12_flag=0;
E13_flag=0;
E14_flag=0;
E15_flag=0;
E16_flag=0;

for (i = 1; i <= 9; i++)
    for (j = 1; j <= 9; j++)
       code[i][j] = '0';

for (i = 1; i <= 9; i++)
    code[i][9-i+1] = '1';

OK=1;
    while (OK)
       driver_function ();
}
```

Appendix D

```
driver_function ()
{
      LAN_EXPERT ();

links2 ();

data ();

finals ();

finals2 ();

out ();
}
```

Appendix E

```
void LAN_EXPERT ()
{
  FILE *ES_file, *fopen();
  ES_file=fopen ("esinA.12", "r");
  if (ES_file==NULL)
  {
    printf ("CAN'T OPEN ES_file in LABOR!\n");
    exit(0);
  }
```

```
      if (d_flag[r][p])
      {
       Z2_flag=1;
       d_flag[r][p]=0;
       p=N;
      } if (e_flag[r][q1])
      {
       Z2_flag=1;
       e_flag[r][q1]=0;
       q1=N;
      } if ((Z_flag) || (Z2_flag) || (Z4_flag))
      Z3_flag=1;

if (!Z3_flag)
      uncertain ();

L1=45;

if (!Z_flag)
   {
      ES_file=fopen ("esinA.12", "r");
      if (ES_file==NULL)
      {
         printf ("CAN'T OPEN ES_file in LABOR!\n");
         exit(0);
      }
   } for (r=1; r<=N; r++)
 {
  if (r<L1 || r==L1)
  {
     for (i = 1; i <= 4; i++)
        U_flag[r][i] =  0;

freadln (ES_file, RULE[r],"\n");

if (r==N)
     {
printf("\n******************* REVIEW RULE[%d]*********************\n\n\n",r);
        printf ("RULE[%d] = %s\n", r,RULE[r]);
     }
fscanf (ES_file,"%d",&NP[r]);

if (r==N)
{
   printf ("Number of premises in Rule[%d] =%d\n",r,NP[r]);
   for (q=1; q<=NP[r]; q++)
       U_flag[r][q]=1;
} freadln (ES_file, Premise[44][4],"\n");

for (q=1; q<=NP[r]; q++)
    freadln (ES_file, Premise[r][q],"\n");

if (r==N)
{
  for (q=1; q<=NP[r]; q++)
      printf ("Premise[%d][%d]=%s\n",r,q,Premise[r][q]);

} fscanf (ES_file,"%d",&NL[r]);
fscanf (ES_file,"%d",&NL[44]);

if (r==N)
    printf ("Number of logic used in Rule[%d] =%d\n",r,NL[r]);
```

```c
    if (r==N)
    {
       if (NP[r]==1)
          segment1 ();

if (NL[r]==2)
          segment2 ();

if (NL[r]==3)
          segment3 ();

if (NL[r]==4)
          segment4 ();

if (NL[r]==5)
          segment5 ();

if (NL[r]==6)
          segment6 ();

if (NL[r]==7)
          segment7 ();

if (NL[r]==8)
          segment8 ();

if (NL[r]==9)
          segment9 ();

if (NL[r]==10)
          segment10 ();

if (NL[r]==11)
          segment11 ();

if (NL[r]==12)
          segment12 ();

if (NL[r]==13)
          segment13 ();

if (NL[r]==14)
          segment14 ();

if (NL[r]==15)
          segment15 ();

if (NL[r]==16)
          segment16 ();

fclose (ES_file);
         return;

}
    else
    {
      g1=g1+1;
      continue;
    }

}
  }
}
```

Appendix F

```c
void uncertain ()

{
  view ();
```

```
N=1;
g1=1;

printf ("Please enter the number of the RULE you wish to use\n");
    scanf ("%d",&N);
    printf ("You will be using RULE[%d]\n",N);
    r=N;
    g1=N;

if (r!=41)
    {
    printf ("Do you wish to use fuzzy logic? (y/n)\n");
    scanf ("%1s",response);
    if (resp_check (*response))
      C_flag=1;
    else
      C_flag=0;
    }
}
```

Appendix G

```
void view ()
{
  printf ("\n\n*********************************************\n");
  printf ("      KNOWLEDGE/MODEL-BASED            \n");
  printf ("    EXPERT SYSTEM FOR LAN DEVELOPMENT     \n");
  printf ("*********************************************\n");

printf ("\n\n*****************************************************\n");
  printf (" RULES 1-21,23,25,41,42,43 ARE FOR BALANCED SYSTEMS\n");
  printf ("      USING IEEE 802.4 MEDIA ACCESS PROTOCOL.\n");
  printf (" FIXED PACKET SIZES ARE ASSUMED. THESE RULES ARE\n");
  printf ("FOR NON-EXHAUSTIVE PACKET TRANSMISSION STRATEGIES.\n");
  printf ("  RULES 22 & 24 ARE FOR EXAUSTIVE STRATEGIES.\n");
  printf (" RULES 26-30 USE HIGHER LEVEL PROTOCOLS FOR THE\n");
  printf ("CONTROL OF THE SYSTEMS LISTED ABOVE. RULES 31-40\n");
  printf ("ARE FOR UNBALANCED SYSTEM USING FIXED SIZE PACKETS\n");
  printf ("AND NON-EXHAUSTIVE PACKET TRANSMISSION STRATEGIES.\n");
  printf ("RULES 42,43 ARE FOR BALANCED SYSTEM HAVING FIRST AND\n");
  printf ("  SECOND PRIORITY PACKET TRANSMISSION PROTOCOLS.\n");
  printf (" FOR FURTHER DETAILS PLEASE SEE SUMMARY OF RULES.\n");
  printf ("*****************************************************\n");

printf ("Do you wish to see a summary of the rules? (y/n)\n");
    scanf ("%1s",response);
    if (resp_check (*response))
         summary0 ();
}
```

Appendix H

```
void summary0 ()
{
  printf ("Please enter the number of the RULE you wish to see\n");
  scanf ("%d",&r);
  if (r==1)
     summary1 ();
  if (r==2)
     summary2 ();
  if (r==3)
     summary3 ();
```

```
if (r==4)
    summary4 ();
if (r==5)
    summary5 ();
if (r==6)
    summary6 ();
if (r==7)
    summary7 ();
if (r==8)
    summary8 ();
if (r==9)
    summary9 ();
if (r==10)
summary10 ();
if (r==11)
    summary11 ();
if (r==12)
    summary12 ();
if (r==13)
    summary13 ();
if (r==14)
    summary14 ();
if (r==15)
    summary15 ();
if (r==16)
    summary16 ();
if (r==17)
    summary17 ();
if (r==18)
    summary18 ();
if (r==19)
    summary19 ();
if (r==20)
    summary20 ();
if (r==21)
    summary21 ();
if (r==22)
    summary22 ();
if (r==23)
    summary23 ();
if (r==24)
    summary24 ();
if (r==25)
    summary25 ();
if (r==26)
    summary26 ();
if (r==27)
    summary27 ();
if (r==28)
    summary28 ();
if (r==29)
    summary29 ();
if (r==30)
    summary30 ();
if (r==31)
    summary31 ();
if (r==32)
    summary32 ();
if (r==33)
    summary33 ();
if (r==34)
    summary34 ();
if (r==35)
    summary35 ();
if (r==36)
    summary36 ();
```

```
        if (r==37)
            summary37 ();
        if (r==38)
            summary38 ();
        if (r==39)
            summary39 ();
        if (r==40)
            summary40 ();
        if (r==41)
            summary41 ();
        if (r==42)
            summary42 ();
        if (r==43)
            summary43 ();

printf ("Do you wish to see the summary of another rule? (y/n)\n");
        scanf ("%1s",response);
        if (resp_check (*response))
                Summary0 ();
}
```

Appendix I

```
void summary1 ()
{
  printf ("\n\n****************************************************************\n");
  printf ("                    SUMMARY OF RULES              \n");
  printf ("   RULE 1 calculates the new values of packet length\n");
  printf (" and channel capacity when it is required to reduce\n");
  printf ("          the packet service time by x%%.         \n");
  printf ("****************************************************************\n\n");
} void summary2 ()
{
  printf ("\n\n****************************************************************\n");
  printf ("                    SUMMARY OF RULES              \n");
  printf ("   RULE 2 calculates the new values of packet arrival\n");
  printf ("rate, number of stations, and packet service time when\n");
  printf ("it is required to reduce the token rotation time by x %%.\n");
  printf ("****************************************************************\n\n");
} void summary3 ()
{
  printf ("\n\n****************************************************************\n");
  printf ("                    SUMMARY OF RULES              \n");
  printf ("   RULE 3 calculates the new values of the number of\n");
  printf (" stations connected to LAN and channel utilization when it\n");
  printf ("is required to reduce the mean number of active stations by x%%..\n");
  printf ("****************************************************************\n\n");
} void summary4 ()
{
  printf ("\n\n****************************************************************\n");
  printf ("                    SUMMARY OF RULES              \n");
  printf ("   RULE 4 calculates the new value of the token rotation time\n");
  printf ("       when the packet arrival rate and channel\n");
  printf ("    utilization are changed by x%% and y%% respectively.\n");
  printf ("****************************************************************\n\n");
} void summary5 ()
{
  printf ("\n\n****************************************************************\n");
  printf ("                    SUMMARY OF RULES              \n");
  printf ("   RULE 5 calculates the new values of the channel utilization\n");
```

```
       printf ("    and packet arrival rate when it is required to reduce \n");
       printf ("           the token rotation time by x%%. \n");
       printf ("*********************************************************\n\n");
} void summary6 ()
{
   printf ("\n\n*********************************************************\n");
   printf ("                    SUMMARY OF RULES              \n");
   printf ("  RULE 6 calculates the new values of the token rotation time\n");
   printf ("    and packet arrival rate when it is required to reduce \n");
   printf ("                 the waiting time by x%%. \n");
   printf ("*********************************************************\n\n");
}
```

Appendix J

```
void segment1 ()
{
        E1_flag=1;
        if (r==N)
        {
           printf ("RULE[%d] = Premise[1] \n",r);

deduce[1] = "000000001";

str = "000000001";
           printf ("Loading the L_register with: ");
        } for (i = 1; i <= 9; i++)
           L_register[r][i] = *(str+i-1);

str = "000000000";
        for (i = 1; i <= 9; i++)
           M_register[r][i] = *(str+i-1);

E[r]=1;
        V_flag[r][1]=0;
        printf ("%s\n",deduce[1]);
        U_flag[r][1] =1;
        U_flag[r][2] =0;
        U_flag[r][3] =0;
        U_flag[r][4] =0;
} void segment2 ()
{
        E2_flag=1;
        if (r==N)
        {
           printf ("RULE[%d] = (p[1] & p[2])\n",r);
           printf ("%s\n",deduce[1]);
        }
         deduce[1] = "000000011";

str = "000000011";
        for (i = 1; i <= 9; i++)
           L_register[r][i] = *(str+i-1);

str = "000000000";
        for (i = 1; i <= 9; i++)
           M_register[r][i] = *(str+i-1);

E[r]=2;
        V_flag[r][2]=0;
        U_flag[r][2] =1;
}
```

```c
void segment3 ()
{
        E3_flag=1;
        if (r==N)
          {
            printf ("RULE[%d] = (p[1] or p[2])\n",r);
            deduce[1] = "00000001, 00000010";
            printf ("%s\n",deduce[1]);
          } str = "000000001";
          for (i = 1; i <= 9; i++)
            L_register[r][i] = *(str+i-1);

str = "000000010";
          for (i = 1; i <= 9; i++)
            M_register[r][i] = *(str+i-1);

E[r]=3;
          V_flag[r][2]=1;
          U_flag[r][2] =1;
} void segment4 ()
{
        E4_flag=1;
        if (r==N)
          {
            printf ("RULE[%d] = (p[1] or p[2] or p[3])\n",r);
            deduce[1] = "000000001,000000010, 000000100";
            printf ("%s\n",deduce[1]);
          } str = "000000001";
          for (i = 1; i <= 9; i++)
          L_register[r][i] = *(str+i-1);

str = "000000010";
          for (i = 1; i <= 9; i++)
            M_register[r][i] = *(str+i-1);

str = "000000100";
          for (i = 1; i <= 9; i++)
            N_register[r][i] = *(str+i-1);

E[r]=4;
          V_flag[r][2]=1;
          V_flag[r][3]=1;
          U_flag[r][3] =1;
} void segment5 ()
{
        E5_flag=1;
        if (r==N)
          {
            printf ("RULE[%d] = (p[1] & p[2] & p[3])\n",r);
            deduce[1] = "000000111";
            printf ("%s\n",deduce[1]);
          } str = "000000111";
          for (i = 1; i <= 9; i++)
            L_register[r][i] = *(str+i-1);

str = "000000000";
          for (i = 1; i <= 9; i++)
            M_register[r][i] = *(str+i-1);
```

```
            E[r]=5;
            V_flag[r][3]=0;
            U_flag[r][3] =1;
} void segment6 ()
{
            E6_flag=1;
            if (r==N)
            {
              printf ("RULE[%d] = (p[1] or (p[2] & p[3]))\n",r);
              deduce[1] = "000000100, 000000011";
              printf ("%s\n",deduce[1]);
            } str = "000000011";
              for (i = 1; i <= 9; i++)
                L_register[r][i] = *(str+i-1);

str = "000000100";
              for (i = 1; i <= 9; i++)
                M_register[r][i] = *(str+i-1);

E[r]=6;
              V_flag[r][3]=1;
              U_flag[r][3] =1;
} void segment7 ()
{
            E7_flag=1;
            if (r==N)
            {
              printf ("RULE[%d] =((p[1] & p[3]) or (p[1] & p[2]))\n",r);
              deduce[1] = "000000011, 000000101";
              printf ("%s\n",deduce[1]);
            }
              str = "000000101";
              for (i = 1; i <= 9; i++)
              L_register[r][i] = *(str+i-1);

str = "000000011";
              for (i = 1; i <= 9; i++)
              M_register[r][i] = *(str+i-1);

E[r]=7;
              U_flag[r][3] =1;
} void segment8 ()
{
     E8_flag=1;
     if (r==N)
     {
      printf ("RULE[%d] = ((p[1]&p[4]) or (p[2]&p[4]) or (p[3]&p[4]))\n",r);
      deduce[1] = "000001001, 000000101, 000000011";
      printf ("%s\n",deduce[1]);
     } str = "000001001";
     for (i = 1; i <= 9; i++)
        L_register[r][i] = *(str+i-1);

str = "000000101";
     for (i = 1; i <= 9; i++)
        M_register[r][i] = *(str+i-1);
```

```c
        str = "00000011";
        for (i = 1; i <= 9; i++)
           N_register[r][i] = *(str+i-1);

E[r]=8;
        U_flag[r][4] =1;
} void segment9 ()
{
        E9_flag=1;
        if (r==N)
        {
         printf ("RULE[%d] = (p[1] or p[2] or p[3] or p[4])\n",r);
         deduce[1] = "00000001, 00000010, 00000100, 00001000";
         printf ("%s\n",deduce[1]);
        } str = "00000001";
        for (i = 1; i <= 9; i++)
           L_register[r][i] = *(str+i-1);

str = "00000010";
        for (i = 1; i <= 9; i++)
           M_register[r][i] = *(str+i-1);

str = "00000100";
        for (i = 1; i <= 9; i++)
           N_register[r][i] = *(str+i-1);

str = "00001000";
        for (i = 1; i <= 9; i++)
           O_register[r][i] = *(str+i-1);

E[r]=9;
        V_flag[r][2]=1;
        V_flag[r][3]=1;
        V_flag[r][4]=1;
        U_flag[r][4] =1;
} void segment10 ()
{
        E10_flag=1;
        if (r==N)
        {
          printf ("RULE[%d] =((p[1]&p[3]&p[4]) or (p[2]&p[3]&p[4]))\n",r);
          deduce[1] = "00001101, 00001110";
          printf ("%s\n",deduce[1]);
        } str = "00001101";
        for (i = 1; i <= 9; i++)
           L_register[r][i] = *(str+i-1);

str = "00001110";
        for (i = 1; i <= 9; i++)
           M_register[r][i] = *(str+i-1);

E[r]=10;
        U_flag[r][4] =1;
} void segment11 ()
{
        E11_flag=1;
        if (r==N)
```

```
        {
         printf ("RULE[%d]=((p[1] & p[3]) or (p[2]& p[3]) or p[4])\n",r);
         deduce[1] = "00001000,00000110, 00000101";
         printf ("%s\n",deduce[1]);
        } str = "00000101";
         for (i = 1; i <= 9; i++)
            L_register[r][i] = *(str+i-1);

str = "00000110";
         for (i = 1; i <= 9; i++)
            M_register[r][i] = *(str+i-1);

str = "00001000";
         for (i = 1; i <= 9; i++)
            N_register[r][i] = *(str+i-1);

E[r]=11;
         U_flag[r][4] =1;
} void segment12 ()
{
        E12_flag=1;
        if (r==N)
        {
         printf ("RULE[%d] = ((p[1]&p[2]&p[4]) or (p[3]&p[4]))\n",r);
         deduce[1] = "00001011,00001100";
         printf ("%s\n",deduce[1]);
        } str = "00001011";
         for (i = 1; i <= 9; i++)
            L_register[r][i] = *(str+i-1);

str = "00001100";
         for (i = 1; i <= 9; i++)
            M_register[r][i] = *(str+i-1);

E[r]=12;
         U_flag[r][4] =1;
} void segment13 ()
{
        E13_flag=1;
        if (r==N)
        {
         printf ("RULE[%d] = ((p[1] & p[2]) or p[3] or p[4])\n",r);
         deduce[1] = "00000011, 00000100, 00001000";
         printf ("%s\n",deduce[1]);
        } str = "00000011";
         for (i = 1; i <= 9; i++)
            L_register[r][i] = *(str+i-1);

str = "00000100";
         for (i = 1; i <= 9; i++)
            M_register[r][i] = *(str+i-1);

str = "00001000";
         for (i = 1; i <= 9; i++)
            N_register[r][i] = *(str+i-1);
```

```c
        E[r]=13;
        V_flag[r][3]=1;
        V_flag[r][4]=1;
        U_flag[r][4] =1;
} void segment14 ()
{
        E14_flag=1;
        if (r==N)
        {
         printf ("RULE[%d] = (p[1] & p[2] & p[3] & p[4])\n",r);
         deduce[1] = "000001111";
         printf ("%s\n",deduce[1]);
        } str = "000001111";
         for (i = 1; i <= 9; i++)
           L_register[r][i] = *(str+i-1);

str = "000000000";
         for (i = 1; i <= 9; i++)
           M_register[r][i] = *(str+i-1);

E[r]=14;
         V_flag[r][4]=0;
         U_flag[r][4] =1;
} void segment15 ()
{
        E15_flag=1;
        if (r==N)
        {
         printf ("RULE[%d] =((p[1] & p[2] & p[3]) or p[4])\n",r);
         deduce[1] = "000001000, 000000111";
         printf ("%s\n",deduce[1]);
        } str = "000000111";
         for (i = 1; i <= 9; i++)
           L_register[r][i] = *(str+i-1);

str = "000001000";
         for (i = 1; i <= 9; i++)
           M_register[r][i] = *(str+i-1);

E[r]=15;
         V_flag[r][4]=1;
         U_flag[r][4] =1;
} void segment16 ()
{
        E16_flag=1;
        if (r==N)
        {
         printf ("RULE[%d] =((p[1] & p[2]) or (p[3] & p[4]))\n",r);
         deduce[1] = "000001100, 000000011";
         printf ("%s\n",deduce[1]);
        } str = "000000011";
         for (i = 1; i <= 9; i++)
           L_register[r][i] = *(str+i-1);

str = "000001100";
         for (i = 1; i <= 9; i++)
           M_register[r][i] = *(str+i-1);
```

```
        E[r]=16;
        V_flag[r][3]=1;
        U_flag[r][4] =1;
}
```

Appendix K

```c
void links2 ()
{
    FILE *ES2_file, *fopen();

ES2_file=fopen ("esinB.12", "r");
    if (ES2_file==NULL)
    {
      printf ("CAN'T OPEN ES2_file in links2!\n");
      exit(0);
    } r=N;

for (r=1; r<=N; r++)
    {
     if (r<g1 || r==g1)
     { fscanf (ES2_file, "%1s\n",response);
        if ((*response == 'y') || (*response == 'Y'))
          y6_flag[r]=1;

if ((!y6_flag[r]) && (r==N))
        {
          fclose (ES2_file);
          return;
        } if ((!y6_flag[r]) && (r!=N))
        {
          g1=g1+1;
          continue;
        } if (y6_flag)
        {
          fscanf (ES2_file, "%d", &p);

fscanf (ES2_file, "%1s", response);
          if ( ((*response == 'y') || (*response == 'Y')) &&
               (r==N) )
          {
            y9_flag[r]=1;
            L_flag[r][p]=1;
          }
                if (L_flag[r][p])
                   FU_flag=1;

fscanf (ES2_file, "%1s\n",response);
          if ((*response == 'y') || (*response == 'Y'))
            y7_flag[r]=1;

if ( (y7_flag[r]) && (r==N) )
              printf ("RULE[%d] & RULE[%d]\n",r,p);

if ((!y7_flag[r]) && (y9_flag[r]))
          {
```

```c
    if (r==N)
    {
      printf ("RULE[%d] or RULE[%d]\n",r,p);
      fscanf (ES2_file, "%1s", response);
      if ( ((*response == 'y') || (*response == 'Y')) &&
           (r==N) )
        o_flag[r][p]=1;
    }
   }
  } fscanf (ES2_file, "%1s\n",response);
    if ((*response == 'y') || (*response == 'Y'))
     y6A_flag[r]=1;

if ((!y6A_flag[r]) && (r==N))
    {
      fclose (ES2_file);
      return;
    } if ((!y6A_flag[r]) && (r!=N))
    {
      g1=g1+1;
      continue;
    } if (y6A_flag)
    {
      fscanf (ES2_file, "%d",&q1);

fscanf (ES2_file, "%1s", response);
      if ( ((*response == 'y') || (*response == 'Y')) && (r==N))
      {
        y10_flag[r]=1;
        l1_flag[r][q1]=1;
        if (l1_flag[r][q1])
          FU_flag=1;
      } fscanf (ES2_file, "%1s\n",response);
       if ((*response == 'y') || (*response == 'Y'))
         y8_flag[r]=1;

if ( (y8_flag[r]) && (r==N))
         printf ("RULE[%d] & RULE[%d]\n",r,q1);

if ((!y8_flag[r]) && (y10_flag[r]))
       {
         if (r==N)
         {
           printf ("RULE[%d] or RULE[%d]\n",r,q1);

fscanf (ES2_file, "%1s", response);
           if ( ((*response == 'y') || (*response == 'Y')) && (r==N))
             o1_flag[r][q1]=1;
         }
       }
      }
    } if (r<N)
 {
   g1=g1+1;
   continue;
 }
```

```
    if (r==N)
    {
      fclose (ES2_file);
      return;
    }
  }
}
```

Appendix L

```
void data ()
{
    r = N ;

str = "000000000" ;
    for (i = 1 ; i <= 9 ; i++)
        K_register[r][i] = *(str + i - 1) ;

for (i = 1 ; i <= 9 ; i++)
        Q_register[i] = '0' ;

if (u_flag[r][1])
    {
        k[r] = 1 ;

printf ("\n***************** ENTER DATA ******************************\n\n\n") ;

printf ("RULE[%d] = %s\n", r, RULE[r]) ;

if ((C_flag) && (!CH_flag))
        {
          W1[r]=atten (r);
          printf ("\nPremise[%d][1] = %s\n", r, Premise[r][1]) ;
          X1[r][1]=ling (r,x[r]);
        }
        else
        {
        printf ("Premise[%d][1] = %s\n", r, Premise[r][1]) ;

printf ("Is the Premise[1] of RULE[%d] true? (y/n)\n ", r, r) ;

scanf ("%1s", response) ;

if (resp_check (*response))
          LI_flag[r][1]=1;
        } if ((LI_flag[r][1]) || (X1[r][1]>=7))
        {
            u_flag[r][1] = 1 ;

for (j = 1 ; j <= 9 ; j++)
                P_register[j] = code[1][j] ;

for (j = 1 ; j <= 9 ; j++)
            {
                if (P_register[j] == '1')
                    Q_register[j] = '1' ;
            } for (i = 1 ; i <= 9 ; i++)
                K_register[i][i] = Q_register[i] ;
        } part1 ();

if (E[r] == 1)
                section1 ();
        }
        else
            return ;
```

```c
if (U_flag[r][2])
{
    k[r] = 2 ;

printf ("Premise[%d][2] = %s\n", r, Premise[r][2]) ;

if ((C_flag) && (!CH_flag))
        XI[r][2]=ling (r,k[r]);
    else
    {
        printf ("Is the Premise[2] of RULE[%d] true? (y/n)\n ", r, r) ;

scanf ("%Is", response) ;

if (resp_check (*response))
            LI_flag[r][2]=1;
    } if ((LI_flag[r][2]) :: (XI[r][2]>=7))
    {
        b_flag[r][2] = 1 ;

for (j = 1 ; j <= 9 ; j++)
            P_register[j] = code[2][j] ;

for (j = 1 ; j <= 9 ; j++)
        {
            if (P_register[j] == '1')
                Q_register[j] = '1' ;
        } for (i = 1 ; i <= 9 ; i++)
            K_register[i][i] = Q_register[i] ;
    } part2 ();

if (E[r] == 2)
        section2 ();

if (E[r] == 3)
        section3 ();
}
else
    return ;

if (U_flag[r][3])
{
    k[r] = 3 ;

printf ("Premise[%d][3] = %s\n", r, Premise[r][3]) ;

if ((C_flag) && (!CH_flag))
        XI[r][3]=ling (r,k[r]);
    else
    {
        printf ("Is the Premise[3] of RULE[%d] true? (y/n)\n ", r, r) ;

scanf ("%Is", response) ;

if (resp_check (*response))
            LI_flag[r][3]=1;
    } if ((LI_flag[r][3]) :: (XI[r][3]>=7))
    {
        b_flag[r][3] = 1 ;

for (j = 1 ; j <= 9 ; j++)
            P_register[j] = code[3][j] ;

for (j = 1 ; j <= 9 ; j++)
        {
            if (P_register[j] == '1')
                Q_register[j] = '1' ;
        }
        for (i = 1 ; i <= 9 ; i++)
            K_register[i][i] = Q_register[i] ;
    }
```

```
    part3 ();

if (E[r] == 5)
      section5 ();

if (E[r] == 6)
      section6 ();

if (E[r] == 7)
      section7 ();

if (E[r] == 4)
      section4 ();
}
else
    return ;

if (U_flag[r][4])
{
    k[r] = 4 ;

printf ("Premise[%d][4]=%s\n", r, Premise[r][4]) ;

if ((C_flag) && (!CH_flag))
      XI[r][4]=ling (r,k[r]);
    else
    {
      printf ("Is the Premise[4] of RULE[%d] true? (y/n)\n ", r, r) ;

scanf ("%1s", response) ;

if (resp_check (*response))
        LI_flag[r][4]=1;
    }
}
if ((LI_flag[r][4]) || (XI[r][4]>=7))
{
    L_flag[r][4] = 1 ;

for (j = 1 ; j <= 9 ; j++)
        P_register[j] = code[4][j] ;

for (j = 1 ; j <= 9 ; j++)
    {
        if (P_register[j] == '1')
            Q_register[j] = '1' ;
    }
        for (i = 1 ; i <= 9 ; i++)
            K_register[i][i] = Q_register[i] ;
} part4 ();

if (E[r] == 14)
      section14 ();

if (E[r] == 9)
      section9 ();

if (E[r] == 15)
      section15 ();

if (E[r] == 16)
      section16 ();

if (E[r] == 12)
      section12 ();

if (E[r] == 10)
      section10 ();

if (E[r] == 11)
    section11 ();

if (E[r] == 8)
      section8 ();
```

```
            if (E[r] == 13)
                section13 ();
            else
                return ;
        }
        return ;
}
```

Appendix M

```
atten (r)

int r;

{
        printf ("\nPlease enter the Attenuation Factor of RULE[%d]\n",r) ;
        printf ("by selecting the number of one of the following:\n") ;
        printf ("descriptions:\n") ;
        printf ("6. Meaningful Chance\n");
        printf ("7. Most Likely\n") ;
        printf ("8. Extremely Likely\n") ;
        printf ("9. Certain\n\n") ;
        scanf ("%d", &WI[r]) ;
        printf ("The number of selected description is %d\n", WI[r]);

if (WI[r]==6)
            printf ("Attenuation Factor of RULE[%d] is Meaningful Chance\n\n",r) ;
        if (WI[r]==7)
            printf ("Attenuation Factor of RULE[%d] is Most Likely\n\n",r) ;
        if (WI[r]==8)
            printf ("Attenuation Factor of RULE[%d] is Extremely Likely\n\n",r) ;
        if (WI[r]==9)
            printf ("Attenuation Factor of RULE[%d] is Certain\n\n",r) ;

return (WI[r]);
}
```

Appendix N

```
ling (r,k)

int r,
    k;

{
        printf ("Please enter the certainty of Premise[%d][%d]\n",r,k) ;
        printf ("by selecting the number of one of the following\n") ;
        printf ("descriptions:\n") ;
        printf ("1. Impossible\n") ;
        printf ("2. Extremely Unlikely\n") ;
        printf ("3. Very Low Chance\n") ;
        printf ("4. Small Chance\n") ;
        printf ("5. Maybe\n");
        printf ("6. Meaningful Chance\n");
        printf ("7. Most Likely\n") ;
        printf ("8. Extremely Likely\n") ;
        printf ("9. Certain\n\n") ;
        scanf ("%d", &XI[r][k]) ;
        printf ("The number of selected description is %d\n", XI[r][k]);

if (XI[r][k]==1)
            printf ("Certainty of Premise[%d] is Impossible\n\n",k) ;
        if (XI[r][k]==2)
            printf ("Certainty of Premise[%d] is Extremely Unlikely\n\n",k) ;
        if (XI[r][k]==3)
            printf ("Certainty of Premise[%d] is Very Low Chance\n\n",k) ;
```

```
if (XI[r][k]==4)
  printf ("Certainty of Premise[%d] is Small Chance\n\n",k) ;
if (XI[r][k]==5)
  printf ("Certainty of Premise[%d] is Maybe\n\n",k);
if (XI[r][k]==6)
  printf ("Certainty of Premise[%d] is Meaningful Chance\n\n",k);
if (XI[r][k]==7)
  printf ("Certainty of Premise[%d] is Most Likely\n\n",k);
if (XI[r][k]==8)
  printf ("Certainty of Premise[%d] is Extremely Likely\n\n",k);
if (XI[r][k]==9)
  printf ("Certainty of Premise[%d] is Certain\n\n",k) ;

return (XI[r][k]);
}
```

Appendix O

```
void part1 ()
{
    if (r == 1 :: r == 2 :: r == 3 :: r == 5 :: r == 6 :: r == 11 :: r == 12
         :: r == 14 :: r == 15 :: r == 16 :: r == 17 :: r == 18 :: r == 20 :: r == 21 ::
         r == 22 :: r == 23 :: r == 24 :: r == 31 :: r == 32 :: r == 33 :: r == 34 ::
         r == 35 :: r == 36 :: r == 37 :: r == 38 :: r == 39 :: r == 40 :: r == 41)
      part1a ();

if (r == 4 :: r == 7 :: r == 8 :: r == 9)
      part1b ();

if (r == 7)
      part1c ();

if (r == 8)
      part1d ();

if (r == 4 :: r == 9)
      part1e ();

if (r == 10 :: r == 19 :: r == 42 :: r == 43)
      part1f ();

if (r == 42 :: r == 43)
      part1g ();

if (r == 12 :: r == 18 :: r == 21 :: r == 23)
      part1h ();

if (r == 13 :: r == 25)
      part1i ();

if (r == 14)
      part1j ();

if (r == 31 :: r == 34 :: r == 38 :: r == 39)
      part1k ();

if (r == 32 :: r == 35)
      part1l ();

if (r == 33 :: r == 36)
      part1m ();

if (r == 37 :: r == 40)
      part1n ();
}
```

Appendix P

```
}
void part1a ()
{
        printf ("Please enter the percentage x as a decimal\n") ;
        scanf ("%f", &x[r]) ;
        printf ("Percentage x[%d] = %f \n", r, x[r]) ;
}
```

```c
void partic ()
{
        printf ("Please enter the percentage y as a decimal\n") ;
        scanf ("%f", &y[r]) ;
        printf ("Percentage y[%d] = %f \n", r, y[r]) ;
} void partic ()
{
        printf ("Please enter the present fixed packet size in characters\n") ;
        scanf ("%f", &l[r]) ;
        printf ("l[%d]=%f characters\n", r, l[r]) ;

printf ("Is the change in packet length an increase?(y/n)\n") ;

scanf ("%1s", response) ;

if (resp_check (*response))
            ln[r] = (1 + y[r]) * l[r] ;
        else
            ln[r] = l[r] * (1 - y[r]) ;
} void partid ()
{
        printf ("Please enter the present channel utilization\n") ;
        scanf ("%f", &rho[r]) ;
        printf ("rho[%d]=%f\n", r, rho[r]) ;

if (rho[r] >= 1)
        {
            printf ("EXPERT SYSTEM ISSUES A WARNING!\n") ;
            printf ("CHANNEL UTILIZATION CANNOT BE EQUAL TO OR GREATER THAN ONE!\n") ;
            Z1_flag = 1 ;
            exit (0) ;
        } printf ("Is the change in channel utilization an increase?(y/n)\n") ;

scanf ("%1s", response) ;

if (resp_check (*response))
            rhon[r] = rho[r] * (1 + y[r]) ;
        else
            rhon[r] = rho[r] * (1 - y[r]) ;
} void partie ()
{
        printf ("Please enter the present packet arrival rate in packets/second/station\n") ;
        scanf ("%f", &lambda[r]) ;
        printf ("lambda[%d] = %f packets/second\n", r, lambda[r]) ;

printf ("Is the change in packet arrival rate an increase?(y/n)\n") ;

scanf ("%1s", response) ;

if (resp_check (*response))
            lambdan[r] = lambda[r] * (1 + y[r]) ;
        else
            lambdan[r] = lambda[r] * (1 - y[r]) ;
} void partif ()
{
        printf ("Please enter the percentage x as a decimal\n") ;
        scanf ("%f", &x[r]) ;
        printf ("Percentage x[%d] = %f \n", r, x[r]) ;

printf ("Please enter the present number of stations connected to LAN\n") ;
        scanf ("%d", &D[r]) ;
        printf ("N=%d stations\n", D[r]) ;

printf ("Is the change in number of stations an increase?(y/n)\n") ;

scanf ("%1s", response) ;

if (resp_check (*response))
            Dn[r] = (1 + x[r]) * D[r] ;
        else
            Dn[r] = D[r] * (1 - x[r]) ;
}
```

```
void partia ()
{
        printf ("Please enter the present packet service time in microseconds\n") ;
        scanf ("%f", &xbar(r)) ;
        printf ("xbar[%d] = %f\n", r, xbar(r)) ;

printf ("Please enter the present value of token passing time in microseconds\n") ;
        printf ("(If you do not know the value of token passing time enter 20 microseconds)\n") ;
        scanf ("%f", &tp(r)) ;
        printf ("r=%f microseconds\n", tp(r)) ;
}
```

Appendix Q

```
void section1 ()
{
    if (!C_flag)
    {
        flag[r][1] = identity (L_register[r], K_register[1], 9) ;
        if (flag[r][1])
            sensor[r][1] = 1 ;
    } if (C_flag)
    {
      P1[r][1] = X1[r][1] ;

is=1;
      Y1[r][1] = table2 (W1[r], X1[r][1], is);

if (Y1[r][1]>=7)
         sensor[r][1] = 1 ;
    }
} void section2 ()
{
    if (!C_flag)
    {
      flag[r][1] = identity (L_register[r], K_register[1], 9) ;
      if (flag[r][1])
          sensor[r][1] = 1 ;
    } if (C_flag)
    {
      is=1;
      P1[r][2] = table2 (X1[r][1], X1[r][2], is);

is=1;
      Y1[r][2] = table2 (W1[r], P1[r][2], is);
      if (Y1[r][2]>=7)
         sensor[r][1] = 1 ;
    }
} void section3 ()
{
    if (!C_flag)
    {
       flag[r][1] = identity (L_register[r], K_register[1], 9) ;
       if (flag[r][1])
           sensor[r][1] = 1 ;

flag[r][1] = identity (M_register[r], K_register[1], 9) ;
       if (flag[r][1])
           sensor[r][2] = 1 ;
    }
```

```
    if (C_flag)
    {
      is=0;
      P1[r][2] = table2 (X1[r][1], X1[r][2], is);
      is=1;
      X1[r][1] = table2 (W1[r], X1[r][1], is);
      if (X1[r][1]>=7)
        sensor[r][1] = 1 ;
      is=1;
      X1[r][2] = table2 (W1[r], X1[r][2], is);
      if (X1[r][2]>=7)
        sensor[r][2] = 1 ;
    )
)

void section5 ()
{
    if (!C_flag)
    {
      flag[r][1] = identity (L_register[r], K_register[1], 9) ;
      if (flag[r][1] :: S_flag[r][1])
          sensor[r][1] = 1 ;
    )

if (C_flag)
    {
      is=1;
      P1[r][3] = table3 (X1[r][1], X1[r][2], X1[r][3], is);

is=1;
      Y1[r][3] = table2 (W1[r], P1[r][3], is);
      if (Y1[r][3]>=7 :: S_flag[r][1])
          sensor[r][1] = 1 ;
    )
)

void section6 ()
{
    if (!C_flag)
    {
      flag[r][1] = identity (L_register[r], K_register[1], 9) ;
      if (flag[r][1])
          sensor[r][1] = 1 ;

flag[r][1] = identity (M_register[r], K_register[1], 9) ;
      if (flag[r][1])
          sensor[r][2] = 1 ;
    )

if (C_flag)
    {
      is=1;
      Y1[r][2] = table2 (X1[r][1], X1[r][2], is);
      is=0;
      P1[r][3] = table2 (Y1[r][2], X1[r][3], is);

is=1;
      Y1[r][2] = table2 (W1[r], Y1[r][2], is);
      if (Y1[r][2]>=7)
         sensor[r][1] = 1 ;
      is=1;
      X1[r][3] = table2 (W1[r], X1[r][3], is);
      if (X1[r][3]>=7)
         sensor[r][2] = 1 ;
    )
)

void section7 ()
{
    if ((!C_flag) :: ((C_flag) && (r==41)))
```

```
    {
       flag[r][1] = identity (L_register[r], K_register[1], 9) ;
       if (flag[r][1] :: S_flag[r][1])
           sensor[r][1] = 1 ;

flag[r][1] = identity (M_register[r], K_register[1], 9) ;
       if (flag[r][1] :: S_flag[r][2])
           sensor[r][2] = 1 ;
    )

if ((C_flag) && (r!=41))
    {
      is=1;
      Y1[r][3] = table2 (X1[r][1], X1[r][2], is);
      is=1;
      Z1[r][3] = table2 (X1[r][1], X1[r][3], is);
      is=0;
      P1[r][3] = table2 (Y1[r][3], Z1[r][3], is);

is=1;
      Y1[r][3] = table2 (W1[r], Y1[r][3], is);
      if (Y1[r][3]>=7 :: S_flag[r][1])
         sensor[r][2] = 1 ;
      is=1;
      Z1[r][3] = table2 (W1[r], Z1[r][3], is);
      if (Z1[r][3]>=7 :: S_flag[r][2])
         sensor[r][1] = 1 ;
    )
)

void section4 ()
{
    if (!C_flag)
    {
       flag[r][1] = identity (L_register[r], K_register[1], 9) ;
       if (flag[r][1])
           sensor[r][1] = 1 ;

flag[r][1] = identity (M_register[r], K_register[1], 9) ;
       if (flag[r][1])
           sensor[r][2] = 1 ;

flag[r][1] = identity (N_register[r], K_register[1], 9) ;
       if (flag[r][1])
           sensor[r][3] = 1 ;
    )

if (C_flag)
    {
      is=0;
      P1[r][3] = table3 (X1[r][1], X1[r][2], X1[r][3], is);

is=1;
      X1[r][1] = table2 (W1[r], X1[r][1], is);
      if (X1[r][1]>=7)
         sensor[r][1] = 1 ;
      is=1;
      X1[r][2] = table2 (W1[r], X1[r][2], is);
      if (X1[r][2]>=7)
         sensor[r][2] = 1 ;
      is=1;
      X1[r][3] = table2 (W1[r], X1[r][3], is);
      if (X1[r][3]>=7)
         sensor[r][3] = 1 ;
    )
)

void section14 ()
{
    if (!C_flag)
```

```
      flag[r][1] = identity (L_register[r], K_register[1], 9) ;
      if (flag[r][1])
          sensor[r][1] = 1 ;
   )

if (C_flag)
   {
     is=1;
     P1[r][4] = table4 (X1[r][1], X1[r][2], X1[r][3], X1[r][4], is);

is=1;
     Y1[r][4] = table2 (W1[r], P1[r][4], is);
     if (Y1[r][4]>=7)
        sensor[r][1] = 1 ;
   )

oid section9 ()

if (!C_flag)
   {
     flag[r][1] = identity (L_register[r], K_register[1], 9) ;
     if (flag[r][1])
         sensor[r][1] = 1 ;

flag[r][1] = identity (M_register[r], K_register[1], 9) ;
     if (flag[r][1])
         sensor[r][2] = 1 ;

flag[r][1] = identity (N_register[r], K_register[1], 9) ;
     if (flag[r][1])
         sensor[r][3] = 1 ;

flag[r][1] = identity (O_register[r], K_register[1], 9) ;
     if (flag[r][1])
         sensor[r][4] = 1 ;
   )

if (C_flag)
   {
     is=0;
     P1[r][4] = table4 (X1[r][1], X1[r][2], X1[r][3], X1[r][4], is);

is=1;
     X1[r][1] = table2 (W1[r], X1[r][1], is);
     if (X1[r][1]>=7)
        sensor[r][1] = 1 ;
     is=1;
     X1[r][2] = table2 (W1[r], X1[r][2], is);
     if (X1[r][2]>=7)
        sensor[r][2] = 1 ;

is=1;
     X1[r][3] = table2 (W1[r], X1[r][3], is);
     if (X1[r][3]>=7)
        sensor[r][3] = 1 ;

is=1;
     X1[r][4] = table2 (W1[r], X1[r][4], is);
     if (X1[r][4]>=7)
        sensor[r][4] = 1 ;
   )

oid section15 ()

if (!C_flag)
   {
     flag[r][1] = identity (L_register[r], K_register[1], 9) ;
```

```
    if (flag[r][1])
        sensor[r][1] = 1 ;

flag[r][1] = identity (M_register[r], K_register[1], 9) ;
    if (flag[r][1])
        sensor[r][2] = 1 ;
    )

if (C_flag)
    {
      is=1;
      Y1[r][3] = table3 (X1[r][1], X1[r][2], X1[r][3], is);
      is=0;
      P1[r][4] = table2 (Y1[r][3], X1[r][4], is);

is=1;
      Y1[r][3] = table2 (W1[r], Y1[r][3], is);
      if (Y1[r][3]>=7)
        sensor[r][1] = 1 ;

is=1;
      X1[r][4] = table2 (W1[r], X1[r][4], is);
      if (X1[r][4]>=7)
        sensor[r][2] = 1 ;
    )
)

void section16 ()
{
    if (!C_flag)
    {
      flag[r][1] = identity (L_register[r], K_register[1], 9) ;
      if (flag[r][1])
        sensor[r][1] = 1 ;

flag[r][1] = identity (M_register[r], K_register[1], 9) ;
      if (flag[r][1])
        sensor[r][2] = 1 ;
    )
    if (C_flag)
    {
      is=1;
      Y1[r][2] = table2 (X1[r][1], X1[r][2], is);
      is=1;
      Z1[r][4] = table2 (X1[r][3], X1[r][4], is);
      is=0;
      P1[r][4] = table2 (Y1[r][2], Z1[r][4], is);
      is=1;
      Y1[r][2] = table2 (W1[r], Y1[r][2], is);
      if (Y1[r][2]>=7)
        sensor[r][1] = 1 ;

is=1;
      Z1[r][4] = table2 (W1[r], Z1[r][4], is);
      if (Z1[r][4]>=7)
        sensor[r][2] = 1 ;
    )
)

void section12 ()
{
    if (!C_flag)
    {
      flag[r][1] = identity (L_register[r], K_register[1], 9) ;
      if (flag[r][1])
        sensor[r][1] = 1 ;

flag[r][1] = identity (M_register[r], K_register[1], 9) ;
      if (flag[r][1])
        sensor[r][2] = 1 ;
    )
```

```
    if (C_flag)
    {
      is=1;
      Y1[r][4] = table3 (X1[r][1], X1[r][2], X1[r][4], is);
      is=1;
      Z1[r][4] = table2 (X1[r][3], X1[r][4], is);
      is=0;
      P1[r][4] = table2 (Y1[r][4], Z1[r][4], is);

is=1;
      Y1[r][4] = table2 (W1[r], Y1[r][4], is);
      if (Y1[r][4]>=7)
         sensor[r][1] = 1 ;

is=1;
      Z1[r][4] = table2 (W1[r], Z1[r][4], is);
      if (Z1[r][4]>=7)
         sensor[r][2] = 1 ;
    }
} void section10 ()
{
    if (!C_flag)
    {
      flag[r][1] = identity (L_register[r], K_register[1], 9) ;
      if (flag[r][1])
          sensor[r][1] = 1 ;

flag[r][1] = identity (M_register[r], K_register[1], 9) ;
      if (flag[r][1])
          sensor[r][2] = 1 ;
    } if (C_flag)
    {
      is=1;
      Y1[r][4] = table3 (X1[r][1], X1[r][3], X1[r][4], is);
      is=1;
      Z1[r][4] = table3 (X1[r][2], X1[r][3], X1[r][4], is);
      is=0;
      P1[r][4] = table2 (Y1[r][4], Z1[r][4], is);

is=1;
      Y1[r][4] = table2 (W1[r], Y1[r][4], is);
      if (Y1[r][4]>=7)
         sensor[r][1] = 1 ;

is=1;
      Z1[r][4] = table2 (W1[r], Z1[r][4], is);
      if (Z1[r][4]>=7)
         sensor[r][2] = 1 ;
    }
} void section11 ()
{
    if (!C_flag)
    {
      flag[r][1] = identity (L_register[r], K_register[1], 9) ;
      if (flag[r][1])
          sensor[r][1] = 1 ;

flag[r][1] = identity (M_register[r], K_register[1], 9) ;
      if (flag[r][1])
          sensor[r][2] = 1 ;

flag[r][1] = identity (N_register[r], K_register[1], 9) ;
      if (flag[r][1])
          sensor[r][3] = 1 ;
    }
```

```
     if (C_flag)
     {
       is=1;
       Y1[r][4] = table2 (X1[r][1], X1[r][3], is);
       is=1;
       Z1[r][4] = table2 (X1[r][2], X1[r][3], is);
       is=0;
       P1[r][4] = table3 (Y1[r][4], Z1[r][4], X1[r][4], is);

is=1;
       Y1[r][4] = table2 (W1[r], Y1[r][4], is);
       if (Y1[r][4]>=7)
          sensor[r][1] = 1 ;

is=1;
       Z1[r][4] = table2 (W1[r], Z1[r][4], is);
       if (Z1[r][4]>=7)

is=1;
       X1[r][4] = table2 (W1[r], X1[r][4], is);
          sensor[r][2] = 1 ;
       if (X1[r][4]>=7)
          sensor[r][3] = 1 ;
     }
} void section8 ()
{
     if (!C_flag)
     {
        flag[r][1] = identity (L_register[r], K_register[1], 9) ;
        if (flag[r][1])
            sensor[r][1] = 1 ;

flag[r][1] = identity (M_register[r], K_register[1], 9) ;
        if (flag[r][1] || S_flag[r][2])
            sensor[r][2] = 1 ;

flag[r][1] = identity (N_register[r], K_register[1], 9) ;
        if (flag[r][1])
            sensor[r][3] = 1 ;
     } if (C_flag)
     {
       is=1;
       Y1[r][4] = table2 (X1[r][1], X1[r][2], is);
       is=1;
       Z1[r][4] = table2 (X1[r][1], X1[r][3], is);
       is=1;
       X1[r][4] = table2 (X1[r][1], X1[r][4], is);
       is=0;
       P1[r][4] = table3 (Y1[r][4], Z1[r][4], X1[r][4], is);

is=1;
       Y1[r][4] = table2 (W1[r], Y1[r][4], is);
       if (Y1[r][4]>=7)
          sensor[r][3] = 1 ;

is=1;
       Z1[r][4] = table2 (W1[r], Z1[r][4], is);
       if (Z1[r][4]>=7 || S_flag[r][2])
          sensor[r][2] = 1 ;

is=1;
       X1[r][4] = table2 (W1[r], X1[r][4], is);
       if (X1[r][4]>=7)
          sensor[r][1] = 1 ;
     }
}
```

```
void section13 ()
{
    if (!C_flag)
    {
       flag[r][1] = identity (L_register[r], K_register[1], 9) ;
       if (flag[r][1])
           sensor[r][1] = 1 ;
       flag[r][1] = identity (M_register[r], K_register[1], 9) ;
       if (flag[r][1])
           sensor[r][2] = 1 ;
       flag[r][1] = identity (N_register[r], K_register[1], 9) ;
       if (flag[r][1])
           sensor[r][3] = 1 ;
    } if (C_flag)
    {
       is=1;
       Y1[r][4] = table2 (X1[r][1], X1[r][2], is);
       is=0;
       P1[r][4] = table3 (Y1[r][4], X1[r][3], X1[r][4], is);

is=1;
       Y1[r][4] = table2 (W1[r], Y1[r][4], is);
       if (Y1[r][4]>=7)
          sensor[r][1] = 1 ;

is=1;
       X1[r][3] = table2 (W1[r], X1[r][3], is);
       if (X1[r][3]>=7)
          sensor[r][2] = 1 ;

is=1;
       X1[r][4] = table2 (W1[r], X1[r][4], is);
       if (X1[r][4]>=7)
          sensor[r][3] = 1 ;
    }
}
```

Appendix R

```
/*---------------------------------------------------------------*\
: IDENTITY  checks to see if M and K are identical.              :
:                                                                :
\*---------------------------------------------------------------*/
identity (M_register, K_register, s)
char   *M_register,
       *K_register ;
int     s ;
{
    int     i,
            j ;
    int     P_flag[14] ;

P_flag[1] = 0 ;
    for (i = 1 ; i <= s ; i++)
    {
        if (M_register[i] == '1' && K_register[i] == '0')
            P_flag[1] = 1 ;
    } if (P_flag[1])
        return (0) ;
    else
        return (1) ;
}
```

```
table2 (L,M,i)

int L,
    M,
    i;
{ int C;

int A_flag;

if (i==1)
       A_flag=1;
    else
       A_flag=0;

if (A_flag)
       C= msgo (L,M);

if (!A_flag)
    {
       L=trans (L);
       M=trans (M);
       C= msgo (L,M);
       C=trans (C);
    } return (C);
} table3 (L,M,N,i)

int L,
    M,
    N,
    i;
{ int B,
    C;

int A_flag;

if (i=1)
       A_flag=1;

if (A_flag)
    {
       B= msgo (L,M);
       C= msgo (B,N);
    } if (!A_flag)
    {
       L=trans (L);
       M=trans (M);
       B= msgo (L,M);
       N=trans (N);
       C= msgo (B,N);
       C=trans (C);
    } return (C);
}
```

```
table4 (L,M,N,O,i)
int L,
    M,
    N,
    O,
    i;

{ int B,
    A,
    C;

int A_flag;

if (i=1)
        A_flag=1;

if (A_flag)
    {
      B= msgo (L,M);
      A= msgo (B,N);
      C= msgo (A,O);
    } if (!A_flag)
    {
      L=trans (L);
      M=trans (M);
      B= msgo (L,M);
      N=trans (N);
      A= msgo (B,N);
      O=trans (O);
      C= msgo (A,O);
      C=trans (C);
    } return (C);
}

/*----------------------------------------------------------------*\
: MSGO gives the certainties when the confidence level is optimistic. :
\*----------------------------------------------------------------*/
msgo (L,M)
int   L,
      M;
{
int C;
    if (L>=M)
      C=M;

if (L<M)
      C=L;

return (C);
}

/*----------------------------------------------------------------*\
: TRANS gives the new values of certainties.                         :
\*----------------------------------------------------------------*/
trans (y)
int   y;

{
```

```c
int x;

if (y==5)
       x=y;

if (y>5)
       x=5-(y-5);

if (y<5)
       x=5+(5-y);

return (x);
}
```

Appendix S

```c
#include <stdio.h>
#include "depoc.h"

void finals ()
{
    if (sensor[r][1] || sensor[r][2] || sensor[r][3] || sensor[r][4])
        R_flag[r] = 1 ;

if ((!Z2_flag) && (!L_flag[r][p]) && (!l1_flag[r][q1]))
        r = N ;

if ((Z2_flag) && (Z4_flag))
        Z2_flag = 0 ;

if ( !Z2_flag && L_flag[r][p] && !d_flag[r][p] )
    {
        G = r ;
        Hp = p ;
    } if ((!Z2_flag) && (l1_flag[r][q1]) && (!e_flag[r][q1]))
    {
        G = r ;
        Hq = q1 ;
    } if ((Z4_flag) && (!Z2_flag) && (!Pp_flag))
        r = G ;

if ((L_flag[r][p]) && (!d_flag[r][p]))
    {
        printf ("BECAUSE RULE[%d] IS USING RULE[%d] AS A PREMISE\n", r, p) ;
        printf ("PLEASE REVIEW RULE[%d] AS A PART OF RULE[%d].\n", p, r) ;
        d_flag[r][p] = 1 ;
      if (d_flag[i][j])
        FU_flag=1;

Pp_flag = 1 ;
        Z4_flag = 1 ;
        Z_flag = 0 ;
        N = p ;
        return ;
    } if ((Z4_flag) && (!Z2_flag) && (!Pq_flag))
        r = G ;

if ((l1_flag[r][q1]) && (!e_flag[r][q1]))
    {
        printf ("BECAUSE RULE[%d] IS USING RULE[%d] AS A PREMISE\n", r, q1) ;
        printf ("PLEASE REVIEW RULE[%d] AS A PART OF RULE[%d].\n", q1, r) ;
        e_flag[r][q1] = 1 ;
```

```
        if (e_flag[i][j])
           FU_flag=1;

Pq_flag = 1 ;
        Z4_flag = 1 ;
        Z_flag = 0 ;
        N = q1 ;
        return ;
    } if (((Z2_flag) || (Z4_flag)) && (!d_flag[r][p]) && (!e_flag[r][q1]))
    {
        N = G ;
        p = Hp ;
        q1 = Hq ;
        r = N ;
    } printf ("Do you wish to check RULE[%d]?(y/n)\n", r) ;
    scanf ("%1s", response) ;

if (resp_check (*response))
    {
      P_flag=1;
      if (r<=16 || r == 41)
      {

AA = inference (L_flag[r][p], L1_flag[r][q1], O_flag[r][p], o1_flag[r][q1],
              R_flag[r], R_flag[p], R_flag[q1]) ;
        if (!AA)
        {
            printf ("\n\n********************************\n") ;
            printf ("RULE[%d] has fired\n", r) ;
            printf ("********************************\n\n") ;
        } if (AA)
        {
          if (!C_flag)
          {
            printf ("\n****************************************************\n") ;
            printf ("RECOMMENDATION OF THE EXPERT SYSTEM FOR RULE[%d]\n", r) ;
            printf ("****************************************************\n") ;
          } if (r == 1)
                msg1 ();

if (r == 2)
                msg2 ();

if (r == 3)
                msg3 ();

if (r == 4)
                msg4 ();

if (r == 5)
                msg5 ();

if (r == 6)
                msg6 ();

if (r == 7)
                msg7 ();

if (r == 8)
                msg8 ();
```

```
            if (r == 9)
               msg9 ();

if (r == 10)
               msg10 ();

if (r == 11 || r == 41)
               msg11 ();

if (r == 12)
               msg12 ();

if (r == 13)
               msg13 ();

if (r == 14)
               msg14 ();

if (r == 15)
               msg15 ();

if (r == 16)
               msg16 ();

}
        }
       }
      return;

}
```

Appendix T

```
void out ()
{
    if ((!Z_flag) && (!d_flag[r][p]) && (!e_flag[r][q]))
         OK = 0 ;
    else
         OK = 1 ;

return ;
}
```

Appendix U

```
/*------------------------------------------------------------------------*\
; INFERENCE checks to see whether the logic of the tree is correct.       ;
\*------------------------------------------------------------------------*/
inference (L, l, O, o, P, Rp, Rq)
int     L,
        l,
        O,
        o,
        P,
        Rp,
        Rq ;

{
    int     a1_flag,
            a2_flag,
            a3_flag,
            a4_flag,
            a5_flag,
            a6_flag,
            a7_flag,
            a8_flag ;
```

```
    a1_flag = 0 ;
    a2_flag = 0 ;
    a3_flag = 0 ;
    a4_flag = 0 ;
    a5_flag = 0 ;
    a6_flag = 0 ;
    a7_flag = 0 ;
    a8_flag = 0 ;

if (C_flag)
        fuzzy ();

if (!L && !l && !O && !o && R)
        a1_flag = 1 ;

if (L && !l && !O &&
            !o && R && Rp)
        a2_flag = 1 ;

if (L &&
            !l && O && !o && (R || Rp))
        a3_flag = 1 ;

if (L && l && O &&
            o && (R || Rp || Rq))
        a4_flag = 1 ;

if (L && l && !O && o &&
            ((R && Rp) || Rq))
        a5_flag = 1 ;

if (L && l && !O && !o &&
            (R && Rp && Rq))
        a6_flag = 1 ;

if (L && l && O && !o &&
            ((R && Rq) || Rp))
        a7_flag = 1 ;

if (a1_flag || a2_flag || a3_flag || a4_flag || a5_flag || a6_flag ||
            a7_flag)
        a8_flag=1;

if ((a8_flag) && (!C_flag))
        return (1) ;

if ((a6_flag) && (C_flag) && (R_flag))
        return (1) ;
    else
        return (0) ;

}
```

Appendix V

```
void fuzzy ()
{
    if (((!L_flag[r][p] && !l_flag[r][q] && !O_flag[r][p] && !ol_flag[r][q]) &&
            R_flag[r]) && (r!=41))
    {
        is=1;
        P1[r][k[r]] = table2 (N1[r], P1[r][k[r]], is);
        if (P1[r][k[r]] >= 7)
        write (P1[r][k[r]],r);
    }
```

```c
if (r==41)
{
    ww[r]=xx[r]*vy[r]*zz[r];
    printf ("\n\n***********************************\n");
    printf ("Certainty of RULE[%d] is %f\n",r,ww[r]);
    printf ("***********************************\n\n");
} if (L_flag[r][p] && !l1_flag[r][q] && !O_flag[r][p] &&
        !o1_flag[r][q] && R_flag[r] && R_flag[p])
{
    is=1;
    K1[r] = table3 (W1[r], P1[r][k[r]], P1[p][k[p]], is);
    write (K1[r],r);
}
if (L_flag[r][p] &&
        !l1_flag[r][q] && O_flag[r][p] && !o1_flag[r][q] && (R_flag[r] ||
        R_flag[p]))
{
    is=0;
    K1[r] = table2 (P1[r][k[r]], P1[p][k[p]], is);
    is=1;
    K1[r] = table2 (W1[r], K1[r], is);
    write (K1[r],r);
} if (L_flag[r][p] && l1_flag[r][q] && O_flag[r][p] &&
        o1_flag[r][q] && (R_flag[r] || R_flag[p] || R_flag[q]))
{
    is=0;
    K1[r] = table3 (P1[r][k[r]], P1[p][k[p]], P1[q][k[q]], is);
    is=1;
    K1[r] = table2 (W1[r], K1[r], is);
    write (K1[r],r);
} if (L_flag[r][p] && l1_flag[r][q] && !O_flag[r][p] && o1_flag[r][q] &&
        ((R_flag[r] && R_flag[p]) || R_flag[q]))
{
    is=1;
    J1[r] = table2 (P1[r][k[r]], P1[p][k[p]], is);
    is=0;
    K1[r] = table2 (J1[r], P1[q][k[q]], is);
    is=1;
    K1[r] = table2 (W1[r], K1[r], is);
    write (K1[r],r);
} if (L_flag[r][p] && l1_flag[r][q] && !O_flag[r][p] && !o1_flag[r][q] &&
        R_flag[r] && R_flag[p] && R_flag[q])
{
    is=1;
    K1[r] = table4 (W1[r], P1[r][k[r]], P1[p][k[p]], P1[q][k[q]], is);
    write (K1[r],r);
} if (L_flag[r][p] && l1_flag[r][q] && O_flag[r][p] && !o1_flag[r][q] &&
        ((R_flag[r] && R_flag[q]) || R_flag[p]))
{
    is=1;
    J1[r] = table2 (P1[r][k[r]], P1[q][k[q]], is);
    is=0;
    K1[r] = table2 (J1[r], P1[p][k[p]], is);
    is=1;
    K1[r] = table2 (W1[r], K1[r], is);
    write (K1[r],r);
}
} void write (L,r)
```

```
nt L,
   r;

if (L==1)
   {
     printf ("\n\n***************************************\n") ;
     printf ("Certainty of RULE[%d] is Impossible\n",r) ;
     printf ("***************************************\n\n") ;
   )

if (L==2)
   {
     printf ("\n\n***************************************\n") ;
     printf ("Certainty of RULE[%d] is Extremely Unlikely\n",r) ;
     printf ("***************************************\n\n") ;
   )

if (L==3)
   {
     printf ("\n\n***************************************\n") ;
     printf ("Certainty of RULE[%d] is Very Low Chance\n",r);
     printf ("***************************************\n\n") ;
   )

if (L==4)
   {
     printf ("\n\n***************************************\n") ;
     printf ("Certainty of RULE[%d] is Small Chance\n",r);
     printf ("***************************************\n\n") ;
   )

if (L==5)
   {
     printf ("\n\n***************************************\n") ;
     printf ("Certainty of RULE[%d] is Maybe\n",r) ;
     printf ("***************************************\n\n") ;
   )

if (L==6)
   {
     printf ("\n\n***************************************\n") ;
     printf ("Certainty of RULE[%d] is Meaningful Chance\n",r) ;
     printf ("***************************************\n\n") ;
   )

if (L==7)
   {
     printf ("\n\n***************************************\n") ;
     printf ("Certainty of RULE[%d] is Most Likely\n",r) ;
     printf ("***************************************\n\n") ;
   )

if (L==8)
   {
     printf ("\n\n***************************************\n") ;
     printf ("Certainty of RULE[%d] is Extremely Likely\n",r);
     printf ("***************************************\n\n") ;
   )

if (L==9)
   {
     printf ("\n\n***************************************\n") ;
     printf ("Certainty of RULE[%d] is Certain\n",r);
     printf ("***************************************\n\n") ;
   )
}
```

Appendix W

```
void asg1 ()
{
```

```c
        if (r==1)
        {
            xbar[r] = analysis1 (l[r], C[r]) ;

printf ("\n\n************************************************\n") ;
            printf ("Present value of packet service time = %f microseconds\n", xbar[r]) ;
            Nxbar = xbar[r] * (1 - x[r]) ;
            printf ("Reduced value of packet service time = %f microseconds\n", Nxbar) ;
            printf ("************************************************\n\n") ;
        } if (r == 1 && (sensor[r][1]) && (!sensor[r][2]))
        {
            NC = analysis1A (l[r], C[r], x[r]) ;

printf ("\n\n************************************************\n") ;
            printf ("Increase channel capacity to %f Mb/s\n", NC) ;
            printf ("************************************************\n\n") ;
        } if (r == 1 && (!sensor[r][1]) && (sensor[r][2]))
        {
            NL = analysis1B (l[r], C[r], x[r]) ;

printf ("\n\n************************************************\n") ;
            printf ("Reduce packet length to %f characters\n", NL) ;
            printf ("************************************************\n\n") ;
        } if (r == 1 && (sensor[r][1]) && (sensor[r][2]))
        {
            NC = analysis1A (l[r], C[r], x[r]) ;

printf ("\n\n************************************************\n") ;
            printf ("Increase channel capacity to %f Mb/s\n", NC) ;

printf ("- - - - - - - - OR - - - - - - - - - - - - - -\n") ;

NL = analysis1B (l[r], C[r], x[r]) ;

printf ("Reduce packet length to %f characters\n", NL) ;
            printf ("************************************************\n\n") ;
        }
} void msg2 ()
{
        if (r==2)
        {
            A3[r] = lambda[r] * D[r] * xbar[r] * (1.0e-6) ;
            if (A3[r] >= 1.0)
            {
                printf ("IT IS NOT POSSIBLE TO PROVIDE A SOLUTION TO THIS CASE\n") ;
                printf ("BECAUSE PARAMETERS ENTERED RESULT IN A DIVISION BY ZERO!\n") ;
                printf ("PLEASE REDUCE STATIONS, PACKET ARRIVAL RATE AND SERVICE TIME!\n") ;
                exit (0) ;
            }
            else
            {
                T[r] = analysis2 (lambda[r], D[r], xbar[r], tp[r]) ;

printf ("\n\n************************************************\n") ;
                printf ("Present value of token rotation time = %f milliseconds\n", T[r]) ;

NT = T[r] * (1 - x[r]) ;
        printf ("Reduced value of token rotation time = %f milliseconds\n", NT) ;
        printf ("************************************************\n\n") ;

if (r == 2 && (!sensor[r][1]) && (!sensor[r][2]) && (sensor[r][3]))
        {
            Nlambda = analysis2A (lambda[r], D[r], xbar[r], tp[r], x[r]) ;
            printf ("\n\n************************************************\n") ;
            printf ("Reduce packet arrival rate to %f packets/s/station\n", Nlambda) ;
            printf ("************************************************\n\n") ;
        } if (r == 2 && (!sensor[r][1]) && (sensor[r][2]) && (!sensor[r][3]))
        {
            NM = analysis2B (lambda[r], D[r], xbar[r], tp[r], x[r]) ;
            ND = NM ;
            printf ("\n\n************************************************\n") ;
            printf ("Reduce number of stations connected to LAN to %d \n", ND) ;
            printf ("************************************************\n\n") ;
        } if (r == 2 && (sensor[r][1]) && (!sensor[r][2]) && (!sensor[r][3]))
        {
            Nxbar = analysis2C (lambda[r], D[r], xbar[r], tp[r], x[r]) ;
            printf ("\n\n************************************************\n") ;
            printf ("Reduce packet service time to %f microseconds\n", Nxbar) ;
```

```
        printf ("(to reduce packet service time please use RULE[1]\n") ;
        printf ("*********************************************\n\n") ;
        V = r ;
        T_flag[r] = 1 ;
        U = 1 ;
    } if (r == 2 && (!sensor[r][1]) && (sensor[r][2]) && (sensor[r][3]))
    {
        Nlambda = analysis2A (lambda[r], D[r], xbar[r], tp[r], x[r]) ;
        printf ("\n\n*********************************************\n") ;
        printf ("Reduce packet arrival rate to %f packets/s/station\n", Nlambda) ;

printf ("-------------------- OR --------------------\n") ;

NM = analysis2B (lambda[r], D[r], xbar[r], tp[r], x[r]) ;
        ND = NM ;
        printf ("Reduce number of stations connected to LAN to %d\n", ND) ;
        printf ("*********************************************\n\n") ;
    } if (r == 2 && (sensor[r][1]) && (!sensor[r][2]) && (sensor[r][3]))
    {
        Nlambda = analysis2A (lambda[r], D[r], xbar[r], tp[r], x[r]) ;
        printf ("\n\n*********************************************\n") ;
        printf ("Reduce packet arrival rate to %f packets/s/station\n", Nlambda) ;

printf ("-------------------- OR --------------------\n") ;

Nxbar = analysis2C (lambda[r], D[r], xbar[r], tp[r], x[r]) ;
        printf ("Reduce packet service time to %f microseconds\n", Nxbar) ;
        printf ("(to reduce packet service time please use RULE[1]\n") ;
        printf ("*********************************************\n\n") ;
        V = r ;
        T_flag[r] = 1 ;
        U = 1 ;
    } if (r == 2 && (sensor[r][1]) && (sensor[r][2]) && (!sensor[r][3]))
            {
                NM = analysis2B (lambda[r], D[r], xbar[r], tp[r], x[r]) ;
                ND = NM ;
                printf ("\n\n*********************************************\n") ;
                printf ("Reduce number of stations connected to LAN to %d\n", ND) ;

printf ("-------------------- OR --------------------\n") ;

Nxbar = analysis2C (lambda[r], D[r], xbar[r], tp[r], x[r]) ;
                printf ("Reduce packet service time to %f microseconds\n", Nxbar) ;
                printf ("(to reduce packet service time please use RULE[1]\n") ;
                printf ("*********************************************\n\n") ;
                V = r ;
                T_flag[r] = 1 ;
                U = 1 ;
            } if (r == 2 && (sensor[r][1]) && (sensor[r][2]) && (sensor[r][3]))
            {
                Nlambda = analysis2A (lambda[r], D[r], xbar[r], tp[r], x[r]) ;
                printf ("\n\n*********************************************\n") ;
                printf ("Reduce packet arrival rate to %f packets/s/station\n", Nlambda) ;

printf ("-------------------- OR --------------------\n") ;

NM = analysis2B (lambda[r], D[r], xbar[r], tp[r], x[r]) ;
                ND = NM ;
                printf ("Reduce number of stations connected to LAN to %d \n", ND) ;

printf ("-------------------- OR --------------------\n") ;

Nxbar = analysis2C (lambda[r], D[r], xbar[r], tp[r], x[r]) ;
                printf ("Reduce packet service time to %f microseconds\n", Nxbar) ;
                printf ("(to reduce packet service time please use RULE[1]\n") ;
                printf ("*********************************************\n") ;
                V = r ;
                T_flag[r] = 1 ;
                U = 1 ;
            }
        }
    } oid msg3 ()

if (r==3)
    {
        AS[r] = analysis3 (D[r], rho[r]) ;

printf ("\n\n*********************************************\n") ;
        printf ("Present mean number of active stations = %f \n", AS[r]) ;
        NAS = AS[r] * (1 - x[r]) ;
```

```c
        printf ("Reduced mean number of active stations = %f \n", NAS) ;
        printf ("*********************************************\n") ;
    } if (r == 3 && (sensor[r][1]) && (!sensor[r][2]))
    {
        NM = analysis3A (D[r], rho[r], x[r]) ;
        ND = NM ;
        printf ("\n\n*********************************************\n") ;
        printf ("Reduce number of stations connected to LAN to %d \n", ND) ;
        printf ("*********************************************\n") ;
    } if (r == 3 && (!sensor[r][1]) && (sensor[r][2]))
    {
        Nrho = analysis3B (D[r], rho[r], x[r]) ;

printf ("\n*********************************************\n") ;
        printf ("Reduce channel utilization to %f \n", Nrho) ;
        printf ("(to reduce channel utilization please use RULE[16])\n") ;
        printf ("*********************************************\n\n") ;
        V = r ;
        T_flag[r] = 1 ;
        U = 16 ;
    }
    if (r == 3 && (sensor[r][1]) && (sensor[r][2]))
    {
        NM = analysis3A (D[r], rho[r], x[r]) ;
        ND = NM ;
        printf ("\n\n*********************************************\n") ;
        printf ("Reduce number of stations connected to LAN to %d \n", ND) ;

printf ("------------------- OR -------------------\n") ;

Nrho = analysis3B (D[r], rho[r], x[r]) ;

printf ("Reduce channel utilization to %f \n", Nrho) ;
        printf ("(to reduce channel utilization please use RULE[16])\n") ;
        printf ("*********************************************\n\n") ;
        V = r ;
        r_flag[r] = 1 ;
        U = 16 ;
    }
} void msg4 ()
{
    if (r == 4)
    {
        NT = analysis4 (rhon[r], lambdan[r]) ;
        PT = analysis4 (rho[r], lambda[r]) ;

printf ("\n\n*********************************************\n") ;
        printf ("Present token rotation time = %f milliseconds\n", PT) ;
        printf ("New token rotation time NT = %f milliseconds\n", NT) ;
        printf ("*********************************************\n\n") ;
    }
} void msg5 ()
{
    if (r == 5)
    {
        T[r] = analysis4 (rho[r], lambda[r]) ;

printf ("\n\n*********************************************\n") ;
        printf ("Present value of token rotation time = %f milliseconds\n", T[r]) ;
        NT = T[r] * (1 - x[r]) ;
        printf ("Reduced value of token rotation time = %f milliseconds\n", NT) ;
        printf ("*********************************************\n\n") ;
    } if (r == 5 && (!sensor[r][1]) && (sensor[r][2]))
    {
        Nrho = analysis5A (rho[r], lambda[r], x[r]) ;

printf ("\n*********************************************\n") ;
        printf ("Decrease channel utilization to %f \n", Nrho) ;
        printf ("(to reduce channel utilization please use RULE[16])\n") ;
        printf ("*********************************************\n\n") ;
        V = r ;
        r_flag[r] = 1 ;
        U = 16 ;
    }
    if (r == 5 && (sensor[r][1]) && (!sensor[r][2]))
    {
        Nlambda = analysis5B (rho[r], lambda[r], x[r]) ;

printf ("\n*********************************************\n") ;
        printf ("Increase packet arrival rate to %f \n", Nlambda) ;
        printf ("*********************************************\n\n") ;
```

```
        }
        if (r == 5 && (sensor[r][1]) && (sensor[r][2]))
        {
            Nrho = analysis5A (rho[r], lambda[r], x[r]) ;
            printf ("\n*********************************************\n") ;

printf ("Decrease channel utilization to %f \n", Nrho) ;
            printf ("(to reduce channel utilization please use RULE[16])\n") ;

printf ("---------------------- OR ----------------------\n") ;

Nlambda = analysis5B (rho[r], lambda[r], x[r]) ;

printf ("Increase packet arrival rate to %f \n", Nlambda) ;
            printf ("*********************************************\n\n") ;
            V = r ;
            T_flag[r] = 1 ;
            V = r ;
            U = 16 ;
        }
    }
}
void msg6 ()
{
    if (r == 6)
    {
        RHO1 = (lambda[r] * T[r] * (1.0e-3)) ;

if (RHO1 < 1.0)
        {
            if (r == 6)
            {
                WT[r] = analysis6 (T[r], lambda[r]) ;

printf ("\n\n*********************************************\n") ;
                printf ("Present value of waiting time = %f milliseconds\n", WT[r]) ;
                NWT = WT[r] * (1 - x[r]) ;
                printf ("Reduced value of waiting time = %f milliseconds\n", NWT) ;
                printf ("*********************************************\n\n") ;
            } if (r == 6 && (!sensor[r][1]) && (sensor[r][2]))
            {
                NT = analysis6A (T[r], lambda[r], x[r]) ;

printf ("\n\n*********************************************\n") ;
                printf ("Reduce token rotation time to %f milliseconds\n", NT) ;
                printf ("(to reduce token rotation time please use RULE[5])\n") ;
                printf ("*********************************************\n\n") ;
                V = r ;
                T_flag[r] = 1 ;
                U = 5 ;
            } if (r == 6 && (sensor[r][1]) && (!sensor[r][2]))
            {
                Nlambda = analysis6B (T[r], lambda[r], x[r]) ;

printf ("\n\n*********************************************\n") ;
                printf ("Reduce packet arrival rate to %f packets/s/station\n", Nlambda) ;
                printf ("*********************************************\n\n") ;
            } if (r == 6 && (sensor[r][1]) && (sensor[r][2]))
            {
                NT = analysis6A (T[r], lambda[r], x[r]) ;

printf ("\n\n*********************************************\n") ;
                printf ("Reduce token rotation time to %f milliseconds\n", NT) ;
                printf ("(to reduce token rotation time please use RULE[5])\n") ;

printf ("---------------------- OR ----------------------\n") ;

Nlambda = analysis6B (T[r], lambda[r], x[r]) ;
                printf ("Reduce packet arrival rate to %f packets/s/station\n", Nlambda) ;
                printf ("*********************************************\n\n") ;
                V = r ;
                T_flag[r] = 1 ;
                U = 5 ;
            }
        }
        else
        {
            printf ("CHANNEL UTILIZATION IS EQUAL TO OR GREATER THAN ONE!\n") ;
            exit (0) ;
        }
    }
}
```

Appendix X

```c
/*----------------------------------------------------------------*\
| analysis22 calculates the mean number of active stations.        |
\*----------------------------------------------------------------*/
float analysis22 (M, rho, s)
float rho,
      s;

int M;

{
float N;        /* mean number of active stations */

N=(rho*M)/s;

return (N);
}

/*----------------------------------------------------------------*\
| analysis24 calculates the new value of the waiting time using multiple |
| packet transmission technique.                                   |
\*----------------------------------------------------------------*/
float analysis24 (i, rho, xbar)
float rho,
      xbar,
        T;

{
float WT;       /* present value of waiting time */

WT=(T/2) + ( (rho*xbar*(1.0e-3))/(2*(1-rho)) );

return (WT);
}

/*----------------------------------------------------------------*\
| analysis1 calculates the new value of the service time.          |
|                                                                  |
\*----------------------------------------------------------------*/
float analysis1 (l, C)
float l,
      C;

{
float xbar;     /* present value of expected service time */ xbar=(8*l)/(C);
    return (xbar);
}

/*----------------------------------------------------------------*\
| analysis1A calculates the new value of channel capacity in order to |
| reduce the service time of fixed length packets by x%.           |
\*----------------------------------------------------------------*/
float analysis1A (l, C, x)
float l,
      x,
      C;
{
float xbar;     /* expected service time x1 */
float NC;       /* new value of channel capacity */ xbar=(8*l)/(C);

NC=(8*l)/((1-x)*xbar);

return (NC);
```

```
}

/*---------------------------------------------------------------------*\
|  analysis1B calculates the new value of packet length in order to     |
|  reduce the service time of fixed length packets by x%.               |
\*---------------------------------------------------------------------*/
float analysis1B (l, C, x)
float l,
      x,
      C;

{
float xbar;    /* expected service time x1 */
float Nl;      /* new value of packet length */ xbar=(8*l)/(C);

Nl=(C*((1-x)*xbar))/8;

return (Nl);
}

/*---------------------------------------------------------------------*\
|  analysis3 calculates the new mean number of active stations.         |
|                                                                       |
\*---------------------------------------------------------------------*/
float analysis3 (M, rho)
float rho;
int M;
{
float N;          /* mean number of active stations */

N=rho*M;

return (N);
}

/*---------------------------------------------------------------------*\
|  analysis3A calculates the new number of stations connected to LAN    |
|  in order to reduce the mean number of active stations by x%.         |
\*---------------------------------------------------------------------*/
float analysis3A (M, rho, x)
float rho;
float x;
int M;

{
float N,          /* mean number of active stations */
      NM;         /* new number of stations connected to LAN */

N=rho*M;
    NM=((1-x)*N)/rho;

return (NM);
}

/*---------------------------------------------------------------------*\
|  analysis3B calculates the new value of channel capacity utilization  |
|  in order to reduce the mean number of active stations by x%.         |
\*---------------------------------------------------------------------*/
float analysis3B (M, rho, x)
float rho;
float x;
int M;

{
float N,          /* mean number of active stations */
      Nrho;       /* new value of channel capacity utilization */
```

```
    N=rho*M;
    Nrho=((1-x)*N)/M;

return (Nrho);
}

/*-----------------------------------------------------------------------*\
| analysis10 calculates the value of token rotation time.                 |
|                                                                         |
\*-----------------------------------------------------------------------*/
float analysis10 (M, r, rho, x)
float rho,
      r,
      x;

int M;

{
float T,    /* token rotation time T */
      N;    /* mean number of active stations */

N=rho*M;

T=((M*r)+(N*x))*(1.0e-3);

return (T);
}

/*-----------------------------------------------------------------------*\
| analysis5A calculates the new value of channel utilization in order     |
| to reduce token rotation time by x%.                                    |
\*-----------------------------------------------------------------------*/
float analysis5A (rho, lambda, x)
float x,
      rho,
      lambda;

{
float T,    /* expected value of token rotation time */
      Nrho; /* new value of channel capacity */

T=rho/lambda;

Nrho=(1-x)*lambda*T;

return (Nrho);
}

/*-----------------------------------------------------------------------*\
| analysis5B calculates the new value of packet arrival rate in order     |
| to reduce token rotation time by x%.                                    |
\*-----------------------------------------------------------------------*/
float analysis5B (rho, lambda, x)
float x,
      rho,
      lambda;

{
float T,        /* expected value of token rotation time */
      Nlambda;  /* new value of packet arrival rate */

T=rho/lambda;

Nlambda=rho/((1-x)*T);

return (Nlambda);
}
```

```
/*-----------------------------------------------------------------------*\
| analysis16 calculates the value of the channel utilization.             |
|                                                                         |
\*-----------------------------------------------------------------------*/
float analysis16 (lambda, T)
float T,
      lambda;

{
float rho;    /* expected value of channel utilization */ rho=lambda*T*(1.0e-3);

if (rho >=1)
    {
      printf ("\n********************* WARNING ***********************\n");
        printf ("CHANNEL UTILIZATION IS EQUAL TO OR GREATER THAN ONE!\n") ;
      printf ("******************************************************");
    }
    return (rho);
}

/*-----------------------------------------------------------------------*\
| analysis16A calculates the new  value packet arrival rate in order to   |
| to reduce the channel utilization by x%.                                |
\*-----------------------------------------------------------------------*/
float analysis16A (lambda, T, x)
float T,
      x,
      lambda;

{
float rho;     /* expected value of channel utilization */
float Nlambda;    /* new value of packet arrival rate */ rho=lambda*T*(1.0e-3);

Nlambda=((1-x)*rho)/(T*(1.0e-3));

return (Nlambda);
}

/*-----------------------------------------------------------------------*\
| analysis16B calculates the new value of the token rotation time in order |
| to reduce the channel utilization by x%.                                |
\*-----------------------------------------------------------------------*/
float analysis16B (lambda, T, x)
float T,
      x,
      lambda;

{
float rho;    /* expected value of channel utilization */
float NT;     /* new value of token rotation time */ rho=lambda*T*(1.0e-3);

NT=((1-x)*rho)/lambda;

NT=NT*(1.0e3);

return (NT);
}

/*-----------------------------------------------------------------------*\
| analysis13 calculates the mean waiting time.                            |
\*-----------------------------------------------------------------------*/
float analysis13 (i, rho)
float rho,
      T;
```

```
{
float WT;      /* present value of waiting time */

WT=T/(2*(1-rho));

return (WT);
}

/*-----------------------------------------------------------------*\
| analysis11A calculates the new value of the token rotation time in order |
| to reduce the waiting time by x%.                                |
\*-----------------------------------------------------------------*/
float analysis11A (T, rho, x)
float rho,
      x,
      T;

{
float NT,      /* new value of the token rotation time T1 */
      WT;      /* present value of waiting time */

WT=T/(2*(1-rho));

NT=(1-x)*WT*(2*(1-rho));

return (NT);
}

/*-----------------------------------------------------------------*\
| analysis11B calculates the new value of rho in order to reduce the |
| waiting time by x%.                                              |
\*-----------------------------------------------------------------*/
float analysis11B (T, rho, x)
float rho,
      x,
      T;

{
float Nrho,    /* new value channel utilization Nrho */
      A,       /* a constant */
      WT;      /* present value of waiting time */

WT=T/(2*(1-rho));

A=((2*(1-x)*WT)-T);

Nrho=A/(2*WT*(1-x));

return (Nrho);
}
```

Appendix Y

```
void finals2 ()
{
    if ((P_flag) && (r>=17) && (r!=41))
    {
        AA = inference (L_flag[r][p], ll_flag[r][q], O_flag[r][p], ol_flag[r][q],
                 H_flag[r], H_flag[p], R_flag[q]) ;

if (AA)
        {
            if (r == 17)
                msg17 ();

if (r == 18)
                msg18 ();
```

```
        if (r == 19)
            msg19 ();

if (r == 20)
            msg20 ();

if (r == 21)
            msg21 ();

if (r == 22)
            msg22 ();

if (r == 23)
            msg23 ();

if (r == 24)
            msg24 ();

if (r == 25)
            msg25 ();

if (r == 26)
            msg26 ();

if (r == 27)
            msg27 ();

if (r == 28)
            msg28 ();

if (r == 29)
            msg29 ();

if (r == 30)
            msg30 ();

if (r == 31 || r == 32 || r == 33)
            msg31 ();

if (r == 34)
            msg34 ();

if (r == 35)
            msg35 ();

if (r == 36)
            msg36 ();

if (r == 37)
            msg37 ();

if (r == 38)
            msg38 ();

if (r == 39)
            msg39 ();

if (r == 40)
            msg40 ();

if (r == 42)
            msg42 ();

if (r == 43)
            msg43 ();
    }
    else
    {
        printf ("\n\n*********************************\n") ;
        printf ("RULE[%d] has not been verified\n", r) ;
        printf ("*********************************\n\n") ;
    }
}
```

```
Z_flag = 0 ;

if (T_flag[V])
{
    printf ("Do you wish to use RULE[%d]?(y/n)\n", U) ;
    scanf ("%1s", response) ;
    if (resp_check (*response))
    {
        T_flag[V] = 0 ;
        Z_flag = 1 ;
        N = U ;
        V = 0 ;
    }
    else
        OK = 0 ;
}
}
```

Appendix Z

```
void msg11 ()
{
    if (r == 11 || r == 41)
    {
        WT[r] = analysis13 (T[r], rho[r]) ;
        printf ("\n\n*********************************************\n") ;
        printf ("Present value of waiting time = %f milliseconds\n", WT[r]) ;
        NWT = W[r] * (1 - v[r]) ;
        printf ("Reduced value of waiting time = %f milliseconds\n", NWT) ;
        printf ("*********************************************\n\n") ;
    } if ((r == 11 || r == 41) && (!sensor[r][1]) && (sensor[r][2]))
    {
        NT = analysis11A (T[r], rho[r], v[r]) ;
        printf ("\n\n*********************************************\n") ;
        printf ("Reduce token rotation time to %f milliseconds\n", NT) ;
        printf ("(to reduce token rotation time please use RULE[5])\n") ;
        printf ("*********************************************\n\n") ;
        V = r ;
        T_flag[r] = 1 ;
        U = 5 ;
    } if ((r == 11 || r == 41) && (sensor[r][1]) && (!sensor[r][2]))
    {
        WT[r] = analysis13 (T[r], rho[r]) ;
        A3[r] = ((2 * (1 - v[r]) * W[r]) - T[r]) ;
        if (A3[r] < 0.0)
        {
            printf ("IT IS NOT POSSIBLE TO PROVIDE A NEW VALUE OF CHANNEL UTILIZATION\n") ;
            printf ("BECAUSE PARAMETERS ENTERED RESULT IN A NEGATIVE VALUE OF RHO!\n") ;
            V = r ;
            T_flag[r] = 1 ;
            U = 5 ;
        }
        else
        {
            Nrho = analysis11B (T[r], rho[r], v[r]) ;
            printf ("\n\n*********************************************\n") ;
            printf ("Reduce channel utilization to %f \n", Nrho) ;
            printf ("(to reduce channel utilization please use RULE[16])\n") ;
            printf ("*********************************************\n") ;
            V = r ;
            T_flag[r] = 1 ;
            U = 16 ;
        }
    } if ((r == 11 || r == 41) && (sensor[r][1]) && (sensor[r][2]))
    {
        NT = analysis11A (T[r], rho[r], v[r]) ;
        printf ("\n\n*********************************************\n") ;
        printf ("Reduce token rotation time to %f milliseconds\n", NT) ;
        printf ("(to reduce token rotation time please use RULE[5])\n") ;

WT[r] = analysis13 (T[r], rho[r]) ;
        A3[r] = ((2 * (1 - v[r]) * WT[r]) - T[r]) ;
        if (A3[r] < 0.0)
        {
```

```
        printf ("****************************************************\n") ;
        printf ("IT IS NOT POSSIBLE TO PROVIDE A NEW VALUE OF CHANNEL UTILIZATION\n") ;
        printf ("BECAUSE PARAMETERS ENTERED RESULT IN A NEGATIVE VALUE OF RHO!\n") ;
        V = r ;
        i_flag[r] = 1 ;
        u = 5 ;
      }
      else
      {
        printf ("----------------------- OR -----------------------\n") ;

Nrho = analysis11B (r[r], rho[r], v[r]) ;
        printf ("****************************************************\n") ;
        printf ("Reduce channel utilization to %f \n", Nrho) ;
        printf ("(to reduce channel utilization please use RULE[16])\n") ;
        printf ("****************************************************\n") ;
        V = r ;
        T_flag[r] = 1 ;
        U = 5 ;
      }
    }
    if ( (r == 11) && ( (((!sensor[r][1]) && (sensor[r][2])) &&
        ((T[r] / NT) >= 2) ) ||
      ( (((sensor[r][1]) && (!sensor[r][2])) &&
        ((rho[r] / Nrho) >= 2) ) ||
      ( (((sensor[r][1]) && (sensor[r][2])) &&
        ( ((r[r] / NT) >= 2) || ((rho[r] / Nrho) >= 2)))) )
    {
        printf ("PLEASE ENTER the present value of packet service time in microseconds\n") ;
        scanf ("%f", &xbar[r]) ;
        printf ("xbar[%d]=%f microseconds\n", r, xbar[r]) ;
        NWT = analysis24 (T[r], rho[r], xbar[r]) ;
        printf ("\n\n****************************************************\n") ;
        printf ("IF YOU USE THE MULTIPLE PACKET TRANSMISSION PROTOCOL THE WAITING\n") ;
        printf ("TIME WILL REDUCE TO %f milliseconds WITHOUT CHANGING RHO OR T.\n", NWT) ;
        printf ("****************************************************\n") ;
    }
  }
}
```

Appendix AA

```
ES_file=fopen ("new.learn", "r");
DT_file=fopen ("temp.file", "w");
freadln (ES_file, RULE[2],"\n");
fprintf (DT_file, "%s\n", RULE[2]);
fprintf (DT_file, "%d\n", 4);
for (NB=2; NB<=5; NB++)
{
  NC=NB+2;
  freadln (ES_file, RULE[NC],"\n");
}
for (NB=3; NB<=5; NB++)
{
  NC=NB+2;
  fprintf (DT_file, "%s\n", RULE[NC]);
}
message = "Page #n is an index page!";
fprintf (DT_file, "%s\n", message);
fprintf (DT_file, "%d\n", 10);
fclose (ES_file);
ES_file=fopen ("new.learn", "w");
fclose (DT_file);
DT_file=fopen ("temp.file", "r");
for (NB=1; NB<=7; NB++)
{
  NC=NB+2;

freadln (DT_file, RULE[NC],"\n");
  fprintf (ES_file, "%s\n", RULE[NC]);
}
```

```
printf ("RULE HAS BEEN MODIFIED!\n");
``` original rule

```
Rule [1]
3
Premise [1][1]
Premise [1][2]
Premise [1][3]
5
``` modified rule

```
Rule [1]
4
Premise [1][1]
Premise [1][2]
Premise [1][3]
Page #n is an index page!
10
```

What is claimed is:

1. An expert system architecture for practice on a digital computer having memory means for storing data files, comprising:

means for storing a plurality of alphanumeric strings representing rule premises and rule conclusions as well as a rule indicator of how the premises of each rule are to be logically combined;

means for reading a user selected one of the rules stored in the memory means to enable subsequent display of the selected rule to the user;

means for displaying the selected rule to the user;

means for querying the user for a response regarding the veracity of each premise of the selected rule;

means for determining from the rule indicator a specific logic to be applied for combining the premises of the selected rule;

means for applying, upon receiving user input regarding the veracity of each rule premise, the specific logic to the selected rule premises to determine whether the specific logic is satisfied;

model means for providing an analytic model of an application being represented by the expert system, said model means comprising a plurality of subroutines that are callable for performing a quantitative analysis of said represented application;

means for querying the user for information to enable performance, using said analytic model, of a quantitative analysis associated with the selected rule;

means for calling a selected model means subroutine associated with the user selected rule;

means for providing, for the selected rule, and expert system recommendation to the user embodying results of the quantitative analysis performed by said model means;

means for comparing quantitative analysis results obtained from said selected subroutine with predetermined acceptability criteria and generating a results comparison;

means, upon finding unacceptable analytic results, for querying the user for additional information to enable performance of an additional quantitative analysis;

means for calling an additional model subroutine to perform said additional quantitative analysis; and said system recommendation embodying the results of said additional quantitative analysis.

2. The expert system architecture of claim 1 further including:

means, upon finding unacceptable analytic results, for electing a predetermined alternate rule to substitute for said selected rule; and means for querying the user for a response regarding the veracity of each alternate rule premise not contained in the selected rule.

3. The expert system architecture of claim 2 further including means for writing directly into said memory means to modify said selected rule in a predetermined manner to form said alternate rule.

4. The expert system architecture of claim 3 additionally including means for writing, following provision to the user of said system recommendation, directly into said memory means to reform said alternate rule into said selected rule.

5. The expert system architecture of claim 2 wherein said alternate rule is stored in said memory means, the identity of said alternate rule being predetermined in accordance with the results comparison.

6. The expert system architecture of claim 2 wherein the rules stored in said memory means can be linked to provide the conclusion of a first rule as one of the premises of a second rule.

7. The expert system architecture of claim 1 wherein the rules stored in said memory means can be linked to provide the conclusion of a first rule as one of the premises of a second rule.

8. The expert system architecture of claim 1, said model means further including neural-net means for associating a set of input data with a set of output data, said neural-net means having input and output nodes and previously determined weights between said input and output nodes for providing output data associated with user provided input data.

9. An expert system architecture for practice on a digital computer having memory means for storing data files, comprising:
- system file module means for storing a plurality of alphanumeric strings representing rule premises and rule conclusions as well as a rule indicator of how the premises of each rule are to be logically combined;
- system program module means including:
  - means for reading a user selected one of the rules stored in said file module means to enable subsequent display of the selected rule to the user;
  - means for displaying the selected rule to the user,
  - means for querying the user for a response regarding the veracity of each premise of the selected rule;
  - means for determining, from the rule indicator read from said file module means, a specific logic to be applied for combining the premises of the selected rule; and
  - means for applying, upon receiving user input regarding the veracity of each rule premise, the specific logic to be selected rule premises to determine whether the specific logic is satisfied;
- model means for providing an analytic model of an application being represented by the expert system, said model means comprising a plurality of subroutines that are callable for performing a quantitative analysis of said represented application;
- data module means including:
  - means for querying the user for information to enable performance, using said analytic model, of a quantitative analysis associated with the selected rule;
  - means for calling a selected model means subroutine associated with the selected rule;
  - means for providing, for the selected rule, an expert system recommendation to the user embodying results of the quantitative analysis performed by said model means;
  - means for comparing quantitative analysis results obtained from said selected subroutine with predetermined acceptability criteria and generating a results comparison;
  - means, upon finding unacceptable analytic results, for querying the user for additional information to enable performance of an additional quantitative analysis;
  - means for calling an additional model subroutine to perform the additional quantitative analysis; and
  - said system recommendation embodying the results of said additional quantitative analysis.

10. The expert system architecture of claim 9, said data module means further including:
- means, upon finding unacceptable analytic results, for electing a predetermined alternate rule to substitute for said selected rule; and
- means for querying the user for a response regarding the veracity of each alternate rule premise not contained in the selected rule.

11. The expert system architecture of claim 10, said data module means including means for writing directly into said file module means to modify said selected rule in a predetermined manner to form said alternate rule.

12. The expert system architecture of claim 11, said data module means including means for writing, following provision to the user of said system recommendation, directly into said file module means to reform said alternate rule into said selected rule.

13. The expert system architecture of claim 10 wherein said alternate rule is stored in said file module means and identified to said program module means by said data module means, the identity of said alternate rule being predetermined in accordance with the results comparison.

14. The expert system architecture of claim 10 wherein said data module means includes default information to use in lieu of information the user is unable to provide upon being queried for information to enable performance of the quantitative analysis.

15. The expert system architecture of claim 10 wherein the rules stored in said file module means can be linked to provide the conclusion of a first rule as one of the premises of a second rule.

16. The expert system architecture of claim 9 wherein said data module means includes default information to use in lieu of information the user is unable to provide upon being queried for information to enable performance of the quantitative analysis.

17. The expert system architecture of claim 9 wherein the rules stored in said file module means can be linked to provide the conclusion of a first rule as one of the premises of a second rule.

18. The expert system architecture of claim 9, said model means further including neural-net means for associating a set of input data with a set of output data, said neural-net means having input and output nodes and previously determined weights between said input and output nodes for providing output data associated with user provided input data.

19. A method for operating a digital computer to practice an expert system, said digital computer having memory means for storing data files, said method comprising the steps of:
- storing in the memory means a plurality of alphanumeric strings representing rule premises and rule conclusions as well as a rule indicator of how the premises of each rule are to be logically combined;
- storing in the memory means an analytic model of an application being represented by the expert system, said model comprising a plurality of subroutines that are callable for performing a quantitative analysis of said represented application and providing corresponding quantitative analysis results;
- reading a user selected one of the stored rules to enable subsequent display of the selected rule to the user;
- displaying the selected rule to the user;
- querying the user for a response regarding the veracity of each premise of the selected rule;
- determining, from the rule indicator associated with the selected rule, a specific logic to be applied for combining the premises of the selected rule;
- applying, upon receiving user input regarding the veracity of each rule premise, the specific logic to the premises of the selected rule to determine whether the specific logic is satisfied;
- querying the user for information to enable performance, using said analytic model, of a quantitative analysis associated with the selected rule;

calling a selected one of the model subroutines associated with the selected rule;

providing, for the selected rule, an expert system recommendation to the user embodying results of the quantitative analysis;

comparing with predetermined acceptability criteria the quantitative analysis results obtained from said selected subroutine and generating a results comparison;

querying the user, upon finding unacceptable analytic results, for additional information to enable performance of an additional quantitative analysis; and calling an additional model subroutine to perform the additional quantitative analysis, said system recommendation embodying the results of said additional quantitative analysis.

20. The method of claim 19 including the additional steps of:

electing, upon finding unacceptable analytic results, a predetermined alternate rule to substitute for said selected rule; and querying the user for a response regarding the veracity of each alternate rule premise not contained in the selected rule.

21. The method of claim 20 including the additional step of:

forming said alternate rule by directly modifying said selected rule in a predetermined manner in accordance with the results comparison.

22. The method of claim 21 including the further step of:

reforming said alternate rule into said selected rule following provision to the user of said system recommendation.

23. The method of claim 20 wherein said alternate rule is distinct from said selected rule;

said method comprising the additional step of:

upon electing to use said alternate rule, retrieving said alternate rule from the memory means, the identity of said alternate rule being predetermined in accordance with the results comparison.

24. The method of claim 20 wherein default information is stored in said memory means to use in lieu of information the user is unable to provide upon being queried for information to enable performance of the quantitative analysis.

25. The method of claim 19 wherein default information is stored in said memory means to use in lieu of information the user is unable to provide upon being queried for information to enable performance of the quantitative analysis.

26. The method of claim 19, said model further including neural-net means for associating a set of input data with a set of output data, said neural-net means having input and output nodes and previously determined weights between said input and output nodes for providing output data associated with user provided input data.

27. A method for operating a digital computer to practice an expert system, said digital computer having memory means for storing data files, said method comprising the steps of:

storing, in system file module means, a plurality of alphanumeric strings representing rule premises and rule conclusions as well as a rule indicator of how the premises of each rule are to be logically combined;

storing, in model means, an analytic model of an application being represented by the expert system, said model comprising a plurality of subroutines that are callable for performing a quantitative analysis of said represented application and providing corresponding quantitative analysis results;

reading, with program module means, a user selected one of the rules stored in said file module means to enable subsequent display of the selected rule to the user;

displaying to the user, with said program module means, the selected rule;

querying the user, with said program module means, for a response regarding the veracity of each premise of the selected rule;

determining within said program module means, from the rule indicator read from said file module means, a specific logic to be applied for combining the premises of the selected rule;

applying within said program module means, upon receiving user responses regarding the veracity of each rule premise, the specific logic to the premises of the selected rule to determine whether the specific logic is satisfied;

querying the user, with data module means, for information to enable performance of a quantitative analysis associated with the selected rule using said analytic model;

calling, from said data module means, selected ones of the model subroutines associated with the selected rule;

providing to the user for the selected rule, through said data module means, a system recommendation embodying results of the quantitative analysis performed by said model;

comparing with predetermined acceptability criteria, within said data module means, the quantitative analysis results obtained from said selected subroutine and generating a results comparison;

querying the user, from said data module means upon finding unacceptable analytic results, for additional information to enable performance of an additional quantitative analysis; and calling from said data module means, an additional model subroutine to perform the additional quantitative analysis, said system recommendation embodying the results of said additional quantitative analysis.

28. The computer operating method of claim 27 including the further steps of:

electing, within said data module means upon finding unacceptable analysis results, a predetermined alternate rule to substitute for said selected rule; and querying the user, with said program module means, for a response regarding the veracity of each alternate rule premise not contained in the selected rule.

29. The computer operating method of claim 28 including the additional step of:

forming said alternate rule by said data module means writing directly into said file module means to modify said selected rule in a predetermined manner in accordance with the results comparison.

30. The computer operating method of claim 29 including the further step of:

reforming, following provision to the user of said system recommendation, said alternate rule into said selected rule by said data module means writing directly into said file module means.

31. The expert system architecture of claim 28 wherein said alternate rule is stored in said file module means and identified to said program module means by said data module means, the identity of said alternate rule being predetermined in accordance with the results comparison.

32. The computer operating method of claim 28 wherein said data module means includes default information to use in lieu of information the user is unable to provide upon being queried for information to enable performance of the quantitative analysis.

33. The computer operating method of claim 27 wherein said data module means includes default information to use in lieu of information the user is unable to provide upon being queried for information to enable performance of the quantitative analysis.

34. The method of claim 27, said model further including neural-net means for associating a set of input data with a set of output output data, said neural-net means having input and output nodes and previously determined weights between said input and output nodes for providing output data associated with user provided input data.

* * * * *